United States Patent [19]
Yasui et al.

[11] Patent Number: 6,081,917
[45] Date of Patent: Jun. 27, 2000

[54] ERROR CORRECTION APPARATUS AND SOLID STATE IMAGE CAPTURING APPARATUS USING THE SAME

[75] Inventors: Toshiyuki Yasui; Yasushi Fukushima, both of Osaka, Japan

[73] Assignee: Matsushita Electric Industrial Co., Ltd., Osaka, Japan

[21] Appl. No.: 08/838,638

[22] Filed: Apr. 9, 1997

[30] Foreign Application Priority Data

Apr. 10, 1996 [JP] Japan .................................. 8-088618

[51] Int. Cl.[7] .................................................. G06F 11/00
[52] U.S. Cl. ............................................................. 714/746
[58] Field of Search .................................. 714/746, 754, 714/758, 786, 752; 364/265.2, 944.5; 348/246

[56] References Cited

U.S. PATENT DOCUMENTS

| | | | |
|---|---|---|---|
| 4,734,774 | 3/1988 | Skaggs et al. | 348/246 |
| 5,091,773 | 2/1992 | Fouche et al. | 348/806 |
| 5,113,246 | 5/1992 | Ninomiya et al. | 348/234 |
| 5,144,446 | 9/1992 | Sudo et al. | 348/246 |
| 5,325,374 | 6/1994 | Hoshi et al. | 714/746 |
| 5,327,247 | 7/1994 | Osborne et al. | 348/100 |
| 5,790,199 | 8/1998 | Gebler et al. | 714/746 |

FOREIGN PATENT DOCUMENTS

| | | |
|---|---|---|
| 58-068378 | 4/1983 | Japan . |
| 04345383 | 12/1992 | Japan . |
| 06165044 | 6/1994 | Japan . |
| 07336565 | 12/1995 | Japan . |

*Primary Examiner*—Trinh L. Tu
*Attorney, Agent, or Firm*—Merchant & Gould P.C.

[57] ABSTRACT

An error correction apparatus corrects erroneous data and reduces deformation of a displayed picture when inputted data are high frequency data around the erroneous data. R, G and B channel signals of data are inputted via input nodes $1a$, $1b$ and $1c$. A controller generates signals ch1 and ch2 which specify the erroneous data channel and a channel for data correction according to a control signal C from an error detection circuit. A correction data circuit generates correction data. For example, if $G(i)$ is assumed to be erroneous data, the correction data circuit generates correction data as $G'(i)=R(i)+G(i+1)-R(i-1)$ based on the previous data $G(i-1)$ provided by a delay circuit and the data of the other errorless channel. The erroneous data $G(i)$ is replaced with the correction data $G'(i)$ and a set of corrected data $R(i)$, $G'(i)$ and $B(i)$ is outputted as output data.

59 Claims, 30 Drawing Sheets

ERROR CORRECTION APPARATUS AND SOLID STATE IMAGE CAPTURING APPARATUS USING THE SAME

BACKGROUND OF THE INVENTION

1. Field of the Invention

The present invention relates to an error correction apparatus for correcting erroneous image data and a solid state image capturing apparatus using the error correction apparatus.

2. Description of the Prior Art

When data error caused in the course of capturing, processing and transmitting are included in the image data of Audio-Video apparatus, such as a VCR, video disk, scanner and camera, the quality of the displayed picture will be deformed seriously. Especially, when defects are in the image capturing device, the captured image data always include the error data at the same corresponding pixel. Consequently, the quality of the displayed picture is always deformed seriously.

Recently, a solid state image capturing device, especially CCD (Charge Coupled Device) is widely used as an image capturing device. As is often the case with CCD, defective pixels resulting from the manufacturing process appear in the finished product. Because of the difficulty and complex integrity of CCD device manufacturing, a perfectly finished device without defective pixels is hard to obtain and it is difficult to raise the product ratio. Consequently, it is widely seen that error correction apparatus is added to a defect-containing CCD to correct erroneous data corresponding to the defective pixels and to make the CCD a useful finished product.

A conventional error correction apparatus is disclosed in the Japanese laid-open application JP58-68378. Error generated by defective pixels in each CCD is corrected by an error correction apparatus corresponding to each CCD. FIG. 29 is a schematic diagram showing a configuration of the conventional error correction apparatus.

In FIG. 29, there are an input node 70 into which digital output data converted from CCD capturing data are input (here the input digital data are digitized by each period for one pixel because CCD outputs data by each pixel), D (Delay) flip-flops 72 and 73 for delaying a period of one pixel, an adder 74, and a shift resistor 75 for shifting an input signal for one bit and reducing the output data to one-half the value of the input signal. An error correction circuit 71 is configured of the above elements. Besides the error correction circuit 71, there are an output node 82 for outputting signals delayed one period of pixel from the signal inputted by the input node 70, an output node 83 for outputting corrected signal outputted from the error correction circuit 71, a selector 76 for outputting one of the signals selected from the signals appearing on output node 82 or 83, and an output node 77 of the error correction apparatus. In addition, there are a controller 78 outputs control signal C, a comparator (CMP) 19, a ROM (Read-Only Memory) 81 for recording the information of coordinates of the defective pixels, and a timing generator (T.G.) for generating required clock for driving CCD.

The above-mentioned conventional error correction apparatus works as follows;

First, as for the function of error correction circuit 71, a digital signal from input node 70 is delayed one period of pixel and inputted to output node 82. The mean value of the data of before and after the data output from 82 is outputted as corrected data to output node 83.

Next, as for the function of controller 78, T.G. 14 outputs coordinates (h, v) of a data which is being inputted to one input node 82 to the comparator 19 as an address signal. The coordinates (x, y) of a defective pixel to be corrected are inputted to the other input node of the comparator 19 as a defective pixel address signal from the ROM 81. Consequently, control signal C, which has high level when erroneous data appears at output node 82, is output from the comparator 19.

The selector 76 normally selects the signal outputted from the output node 82 and it selects the corrected data inputted from output node 83 when control signal C is at a high level. Consequently, erroneous data are replaced with corrected data one after another. Thus, the next coordinates of erroneous data are outputted from the ROM 81 to the comparator 19 after completion of the previous erroneous data replacing process and all erroneous data are replaced with corrected data.

The above-mentioned error correction apparatus only can work well when surrounding data are low frequency data as shown in FIG. 30($a$). When the surrounding data are high frequency data, erroneous data are not corrected to appropriate data as shown in FIG. 30($b$). This margin of error in the correction process becomes noise and it deforms the quality of display images. Therefore, a solid state capturing device that is free or nearly free from defects is required for VCR in order to avoid deformation. However, it is quite difficult to achieve high production ratio for digital high quality vision VCR because of its large scale of integrated pixels and this problem increases the cost for such VCR.

SUMMARY OF THE INVENTION

An object of the present invention is to provide an error correction apparatus that can correct the erroneous data appropriately even when data pattern surrounding erroneous data is high frequency and reduce the deformation of the quality. Another object of the present invention is to provide an error correction apparatus configured of a relatively small scale circuit. Furthermore, an object of the present invention is to provide a solid state image capturing apparatus which can reduce quality deformation even when using a defective device in a capturing element without cost increase.

In order to achieve the above objects and advantages of the invention, a first aspect of the error correction apparatus of the present invention is characterized by means for inputting more than one picture image data, selecting first picture image data and second picture image data among the inputted picture image data, calculating data for correction according to the following formula on the condition that $x(i)$ is erroneous data;

$$y(i)+\{x(i-t)-y(i-t)\} \text{ or } y(i)+\{x(i+t)-y(i+t)\}$$

where i represents arbitrary time, $x(i)$ represents a first picture data at the time of i, $y(i)$ represents a second picture data at the time of i, t represents arbitrary frame period of time, and replacing erroneous data $x(i)$ with one of the above calculated data.

In order to achieve the above objects and advantages of the invention, a second aspect of the error correction apparatus of the present invention is characterized by means for inputting more than one picture image data, selecting first picture image data and second picture image data among the inputted picture image data, calculating data for correction according to the following formula on the condition that $x(i)$ is erroneous data;

$$y(i)+\{x(i-t)+x(i+t)-y(i-t)-y(i+t)\}/2$$

where i represents arbitrary time, x(i) represents a first picture data at the time of i, y(i) represents a second picture data at the time of i, t represents an arbitrary frame period of time, and replacing erroneous data x(i) with the above calculated data.

In order to achieve the above objects and advantages of the invention, a third aspect of the error correction apparatus of the present invention is characterized by means for inputting more than one picture image data, selecting first picture image data and second picture image data among the inputted picture image data, calculating data for correction according to the following formula on the condition that x(i) is erroneous data;

$$y(i)*\{x(i-t)+x(i+t)/y\{(i-t)+y(i+t)\}$$

where i represents arbitrary time, x(i) represents a first picture data at the time of i, y(i) represents a second picture data at the time of i, t represents an arbitrary frame period of time, and replacing erroneous data x(i) with the above calculated data.

In order to achieve the above objects and advantages of the invention, a forth aspect of the error correction apparatus of the present invention is characterized by means for inputting more than one picture image data, selecting first picture image data and second picture image data among the inputted picture image data, calculating first correction data according to following first formula and second correction data according to following second formula on the condition that x(i) is erroneous data;

$$y(i)*\{x(i-t)+x(i+t)/y\{(i-t)+y(i+t)\}\{x(i-t)+x(i+t)\}/2$$

where i represents arbitrary time, x(i) represents a first picture data at the time of i, y(i) represents a second picture data at the time of i, t represents an arbitrary frame period of time, and replacing erroneous data x(i) with one selected from the first correction data and the second correction data.

In order to achieve the above objects and advantages of the invention, a fifth aspect of the error correction apparatus of the present invention is characterized by means for inputting more than one picture image data, selecting first picture image data and second picture image data among the inputted picture image data, calculating correction data according to following formula on the condition that x(i) is erroneous data;

$$\alpha*y(i)*\{x(i-t)+x(i+t)/y\{(i-t)+y(i+t)\}+\beta*\{x(i-t)+x(i+t)\}/2$$

where i represents arbitrary time, x(i) represents a first picture data at the time of i, y(i) represents a second picture data at the time of i, t represents an arbitrary frame period of time, and α and β are real numbers meeting the condition that α+β=1, and replacing erroneous data x(i) with the above calculated data.

In the above-mentioned configuration, it is preferable that the input data are more than one digitized picture image data, and correction data is generated based on processed digital data obtained by reducing more than 1 bit data length from the input digital data.

In order to achieve the above objects and advantages of the invention, a first aspect of the solid state image capturing apparatus of the present invention is characterized by means for comprising solid state image capturing devices, selecting first picture image data and second picture image data among the output picture image data from the solid state image capturing devices, calculating data for correction according to following formula on the condition that x(i) is erroneous data;

$$y(i)+\{x(i-t)-y(i-t)\} \text{ or } y(i)+\{x(i+t)-y(i+t)\}$$

where i represents arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices, and replacing erroneous data x(i) with the one of the above calculated data.

In order to achieve the above object and advantages of the invention, a second aspect of the solid state image capturing apparatus of the present invention is characterized by means for comprising solid state image capturing devices, selecting first picture image data and second picture image data among the output picture image data from the solid state image capturing devices, calculating data for correction according to the following formula on the condition that x(i) is erroneous data;

$$y(i)+\{x(i-t)+x(i+t)-y(i-t)-y(i+t)\}/2$$

where i represents arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices, and replacing erroneous data x(i) with the above calculated data.

In order to achieve the above object and advantages of the invention, a third aspect of the solid state image capturing apparatus of the present invention is characterized by comprising solid state image capturing devices, selecting first picture image data and second picture image data among the output picture image data from the solid state image capturing devices, calculating data for correction according to the following formula on the condition that x(i) is erroneous data;

$$y(i)*\{x(i-t)+x(i+t)/y\{(i-t)+y(i+t)\}$$

where i represents arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices, and replacing erroneous data x(i) with the above calculated data.

In order to achieve the above object and advantages of the invention, a forth aspect of the solid state image capturing apparatus of the present invention is characterized by means for comprising solid state image capturing devices, selecting first picture image data and second picture image data among the output picture image data from the solid state image capturing devices, calculating first correction data according to the following first formula and second correction data according to the following second formula on the condition that x(i) is erroneous data;

$$y(i)*\{x(i-t)+x(i+t)/y\{(i-t)+y(i+t)\}\{x(i-t)+x(i+t)\}/2$$

where i represents arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices, and replacing erroneous data x(i) with one selected from the first correction data and the second correction data.

In order to achieve the above object and advantages of the invention, a fifth aspect of the solid state image capturing apparatus of the present invention is characterized by comprising solid state image capturing devices, selecting first picture image data and second picture image data among the output picture image data from the solid state image capturing devices, calculating first correction data according to the following first formula and second correction data according to the following second formula on the condition that x(i) is erroneous data;

$$\alpha*y(i)*\{x(i-t)+x(i+t)/y\{(i-t)+y(i+t)\}+\beta*\{x(i-t)+x(i+t)\}/2$$

where i represents arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices, and $\alpha$ and $\beta$ are real numbers meeting the condition that $\alpha+\beta=1$, and replacing erroneous data x(i) with the above calculated data.

In the above-mentioned configuration, it is preferable that input data are digital data obtained by digitizing the data from solid state image capturing devices, and correction data are generated based on processed digital data obtained by reducing more than 1 bit data length from the input digital data.

According to these and other objects and advantages of the invention, the error correction apparatus and the solid state image capturing apparatus can correct the erroneous data with a small scale circuit and without cost increase.

The above summary of the present invention is not intended to present each embodiment or every aspect of the present invention. This is the purpose of the figures and associated description which follow.

DESCRIPTION OF THE PREFERRED EMBODIMENTS

Hereinafter preferred embodiments of the present invention will be explained with reference to FIG. 1 to FIG. 28.
First Embodiment The first embodiment of the present invention will be described with reference to FIG. 1 to FIG. 6.

Figure 1:
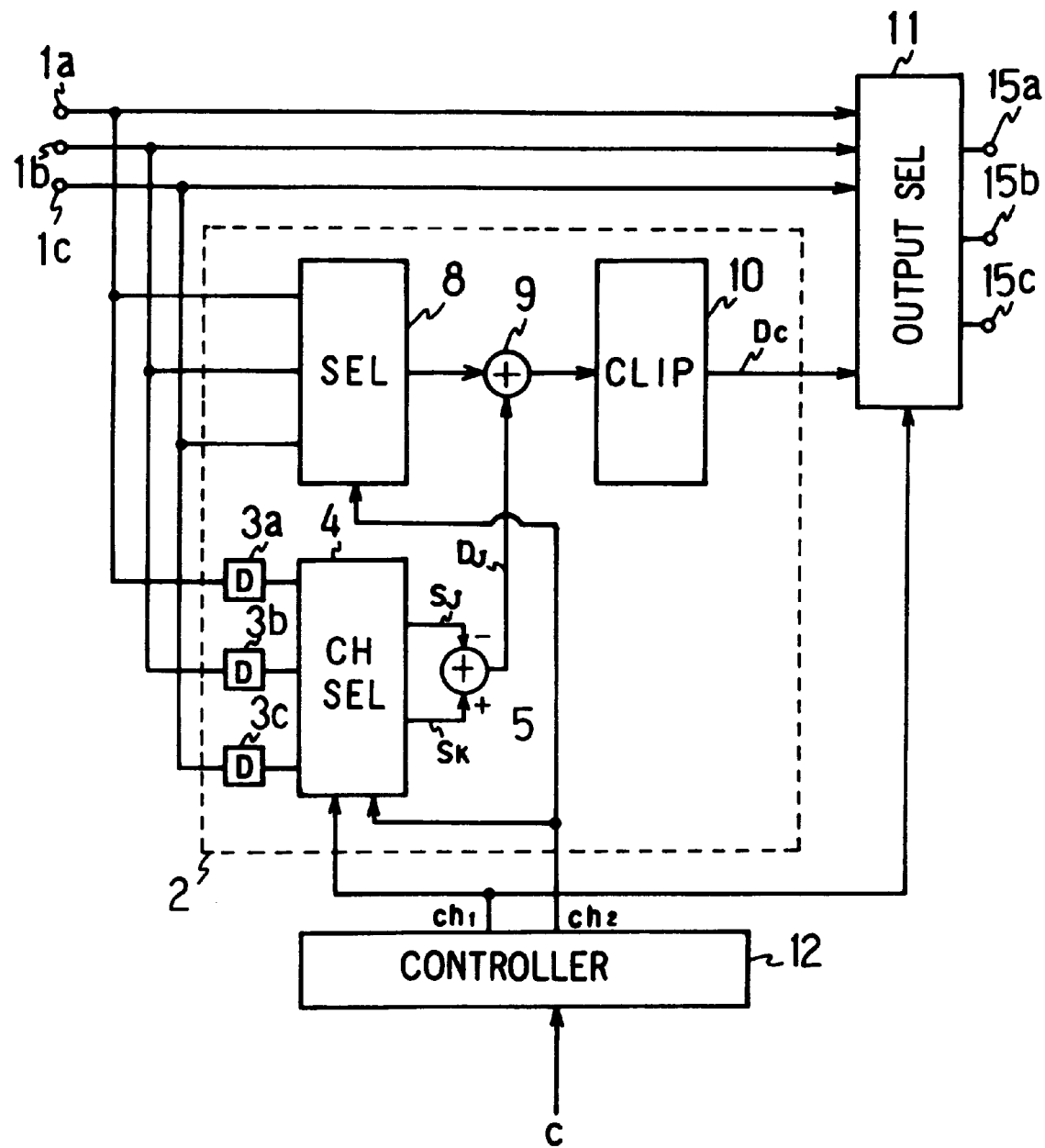
FIG. 1 is a circuit diagram showing a configuration of an error correction apparatus of a first embodiment of the present invention.

Referring first to FIG. 1, this shows a circuit diagram showing a configuration of an error correction apparatus of a first embodiment of the present invention. There are input nodes 1a, 1b and 1c for inputting digital image signals corresponding to each R, G and B color channel, a correction data circuit 2 for generating correction data to correct and replace erroneous data, an output selector 11 for replacing erroneous data of the inputted digital signals with the correction data and outputting the correction data, a controller 12 for generating control signals for the correction process, and output nodes 15a, 15b and 15c for outputting each corrected R, G and B color signals. The error correction apparatus described above generates correction data based on errorless data of other color channels (hereinafter those are described as "correction channels") when there is erroneous data in one of the three color channels (hereinafter it is described as "erroneous channel"), and replaces the erroneous data with correction data.

Figure 2:
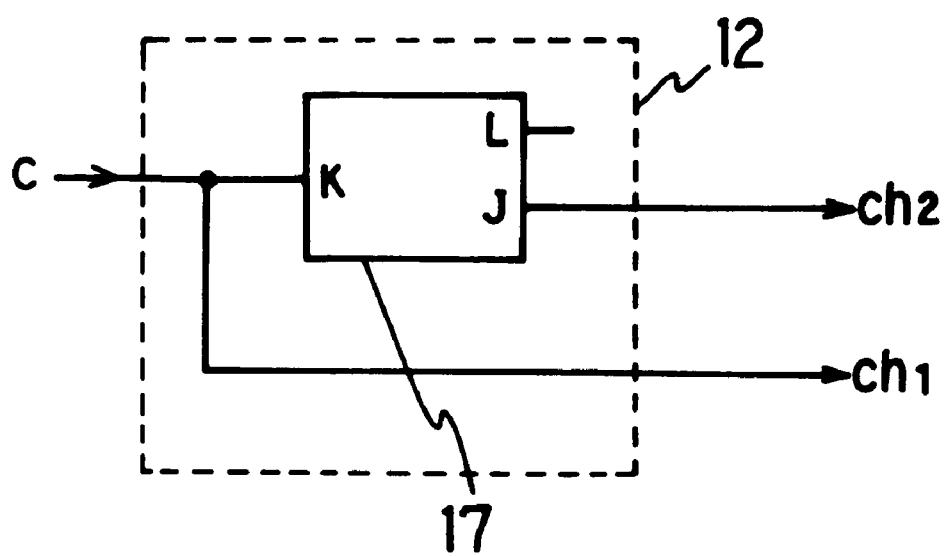
FIG. 2 is a enlarged detail of a circuit diagram of a controller in the error correction apparatus shown in FIG. 1.

FIG. 2 shows an enlarged detail of a circuit diagram of a controller in the error correction apparatus shown in FIG. 1. It generates signals ch1 and ch2 to specify the erroneous channel and the correction channels respectively. Signal C is a signal from a channel of outer error detection means (not shown in FIG. 2) which specifies the existence of erroneous data and an erroneous channel when erroneous data exists. Following Table 1 is an example of a signal C code. Here, signal C consists of 2 bits because signal C specifies one of four status (channel R, G, B and errorless)

TABLE 1

| SIGNAL C CODE | STATUS |
| --- | --- |
| 00 | errorless (no correction required) |
| 01 | R channel data to be corrected |
| 10 | G channel data to be corrected |
| 11 | B channel data to be corrected |

Channel encoder 17 of controller 12 is a circuit for selecting and outputting a set of 2 color channels as a set of color channel L and J based on an inputted erroneous channel (referred to as channel K) according to a predetermined rule. Following Table 2 is an example of a signal C code.

TABLE 2

| INPUT (2 bits) | OUTPUT (2 bits) | |
| --- | --- | --- |
| K | L | J |
| 00 | 00 | 00 |
| 01 (R) | 10 (G) | 11 (B) |
| 10 (G) | 11 (B) | 01 (R) |
| 11 (B) | 01 (R) | 10 (G) |

Figure 3:
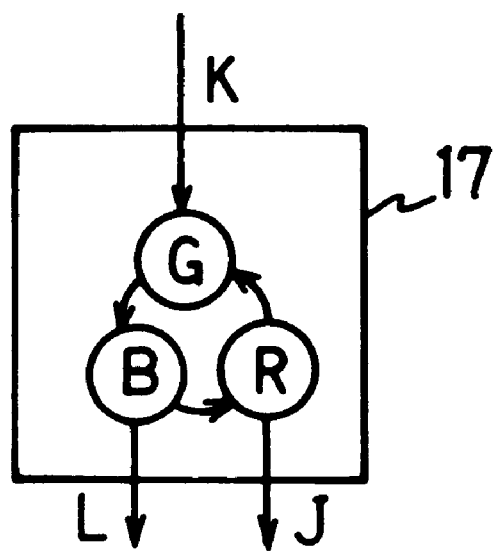
FIG. 3 is a conceptual view showing the operation of a channel encoder of the present invention.

As shown in FIG. 3, when channel K is channel G, channel R is allotted as channel J, channel B is allotted as channel L and outputted. In this embodiment, channel signal C is inputted to the channel encoder 17 and the signal of channel J is as ch2.

Figure 5:
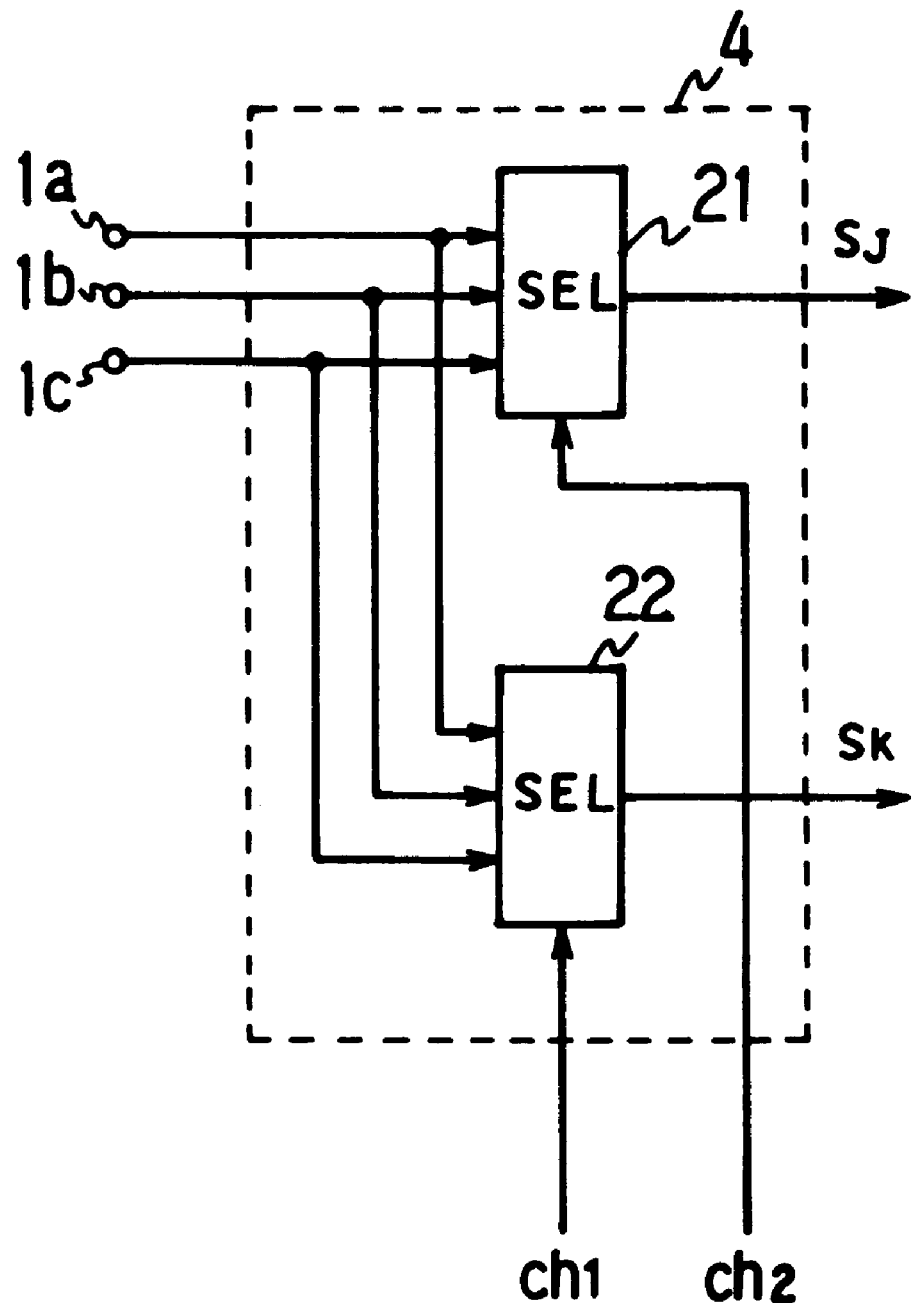
FIG. 5 is a circuit diagram showing a configuration of a channel selector of a first embodiment of the present invention.

As for a correction data circuit 2, referring to FIG. 1, there are delay elements including D flip flop 3a, 3b and 3c for a delaying period corresponding to the sampling period of the digital input data, and a channel selector 4 whose configuration is shown in FIG. 5. In FIG. 5, there are selectors 21 and 22. Channel signals ch1 and ch2 are inputted as select signals respectively, and then signal Sk and Sj are selected from 3 input signals of R, G and B, wherein Sk is erroneous data to be corrected and Sj is a channel signal for correction corresponding to Sk. Returning to FIG. 1, furthermore, there are a subtractor 5 for calculating a differential value Dj of signal Sk and Sj (Dj=Sk−Sj), a selector 8 for selecting and outputting one of inputted signal of channel R, G and B according to ch2, an adder 9, and a circuit 10 for limiting and clipping inputted signal within a predetermined range. Here the maximum value is set as the peak level of the picture signal and the minimum value is set as the black level.

Figure 6:
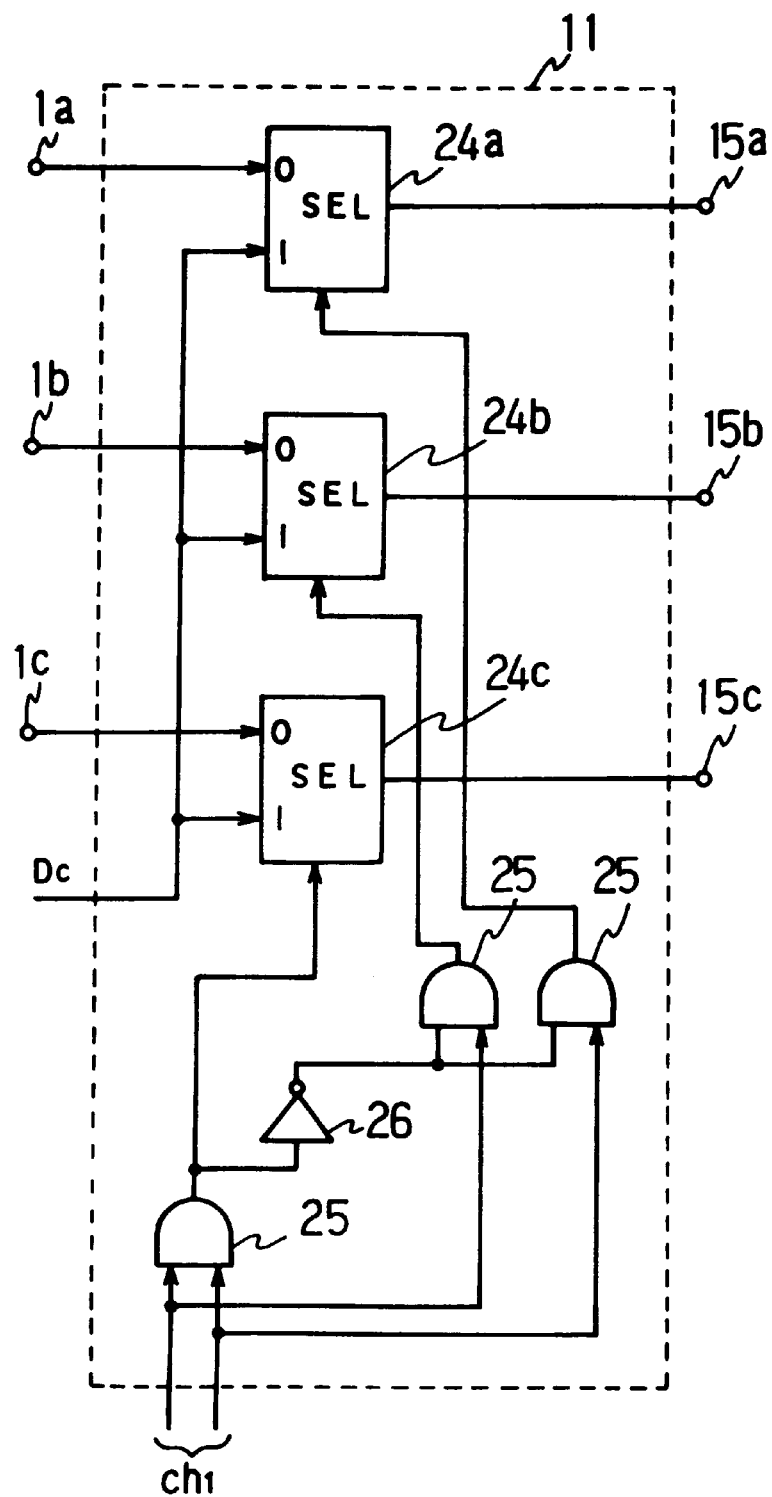
FIG. 6 is a circuit diagram showing a configuration of an output selector of the present invention.

FIG. 6 shows a configuration of an output selector. There are selectors 24a, 24b and 24c corresponding to channel R, G and B respectively. These are configured for selecting one of the signals from inputted signal of R, G, B and correction data Dc generated by correction data circuit 2 according to control signal ch1. Furthermore, there are an and gate 25, and an inverter 26 for inputting high level select signal only to the selector specified by the signal ch1.

The operation of the above-mentioned error correction apparatus of the first embodiment is described as follows.

"i" represents discrete sampled time and R(i), G(i) and B(i) represent inputted digital signals of input nodes 1a, 1b and 1c respectively at the time of "i". The following description is an erroneous data correction process when signal G(i) is erroneous data. In the following case, delay time at each gate except delay elements can be negligible.

First, at the time of "i−1", data R(i−1), G(i−1) and B(i−1) are inputted to the output selector 11 via input nodes 1a, 1b and 1c. At this time, erroneous data do not exist in the inputted data. Therefore, channel signal ch1 becomes code "00" which specifies no correction, and data R(i−1), G(i−1) and B(i−1) are outputted from the output node of the selector 11 as they are.

Next, at the time of "i", data R(i), G(i) and B(i) are inputted to the output selector 11 via input nodes 1a, 1b and 1c. At this time, erroneous data G(i) exists. Therefore, the G channel signal is inputted as the channel signal C from the outer circuit to the controller 12, and the G channel signal specified in channel signal C is outputted as the channel signal ch1, and the R channel signal is outputted as channel signal ch2 from the channel encoder according to the rule shown in Table 2.

The process in the correction data circuit 2 is described below. Data R(i−1), G(i−1) and B(i−1) are inputted to the channel selector 4, and G(i−1) and R(i−1) are outputted as Sk and Sj respectively according to the channel signal ch1 and ch2. Therefore, subtractor 5 outputs differential signal Dj by calculating G(i−1)−R(i−1). On the other hand, the selector 8 outputs R(i) according to the channel signal ch2. Consequently, adder 9 outputs G'(1) calculated by the following Equation 1, and it is outputted as a correction data Dc via the clip circuit 10 to be clipped within the predetermined set range.

$$G'(i)=R(i)+\Delta V =R(i)+G(i-1)-R(i-1) \qquad \text{Equation 1}$$

This correction data Dc is outputted to the output selector 11 with data R(i), G(i) and B(i).

Next, the process in the output selector 11 is described below. The G channel signal is inputted as channel signal ch1 as described above, only the data of channel G are replaced with the correction data. Consequently, R(i), G'(i) and B(i) are outputted via output node 15a, 15b and 15c respectively. The erroneous data G(i) are replaced with the correction data and this work process is completed.

The above description is the case where erroneous data are in the G channel. It can be the same when erroneous data are in R(i), where it can be replaced with correction data based on the B channel data, and also when erroneous data are in B(i), it can be replaced with correction data based on the G channel. According to the error correction apparatus of the present invention described above, when erroneous data exists among a set of input data R, G and B in the output selector 11, correction data are generated by the above-mentioned process and erroneous data are replaced with it.

Figure 4:
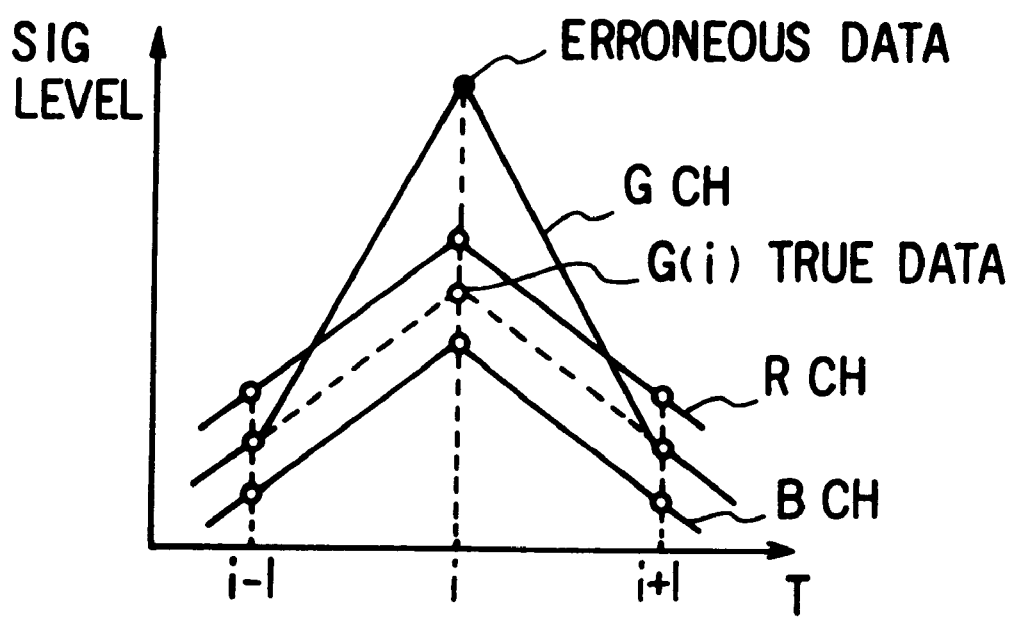
FIG. 4 is a conceptual graph showing input data of the error correction apparatus shown in FIG. 1.

As shown in FIG. 4, when the color of inputted image data is monochrome or similar to monochrome color, the signal level of R, G and B channel are almost equivalent or the difference of signal level among those channels is almost constant around the time "i". Therefore, the correction data shown by Equation 1 approximately equals the true data and appropriate correction can be expected in the case of a high frequency signal whose level has rapid fluctuation before and after the erroneous data at the time "i". Consequently, high quality image data processing can be expected. Normally, the color of the natural picture of high frequency signal is monochrome, and erroneous data can be expected to be corrected efficiently by the present invention.

The correction data circuit 2 also can be configured to generate correction data according to following Equation 2.

$$G'(i)=R(i)+\Delta V=R(i)+G(i+1)-R(i+1) \qquad \text{Equation 2}$$

Second Embodiment

As shown in the first embodiment, when all R, G and B channels have non-zero signal level data such as monochrome picture data, erroneous channel data can be corrected on the basis of other channel data. However, for example, in the case shown in FIG. 7, the G and B channels have a certain value of data and the R channel has zero level, the erroneous G channel data should be corrected based on B channel data. This second embodiment provides a solution for such case. When the G channel data are erroneous data, the channel data having a more similar signal level to the G channel data are selected from the R channel data or B channel data and correction data will be generated based on the selected channel data.

Figure 8:
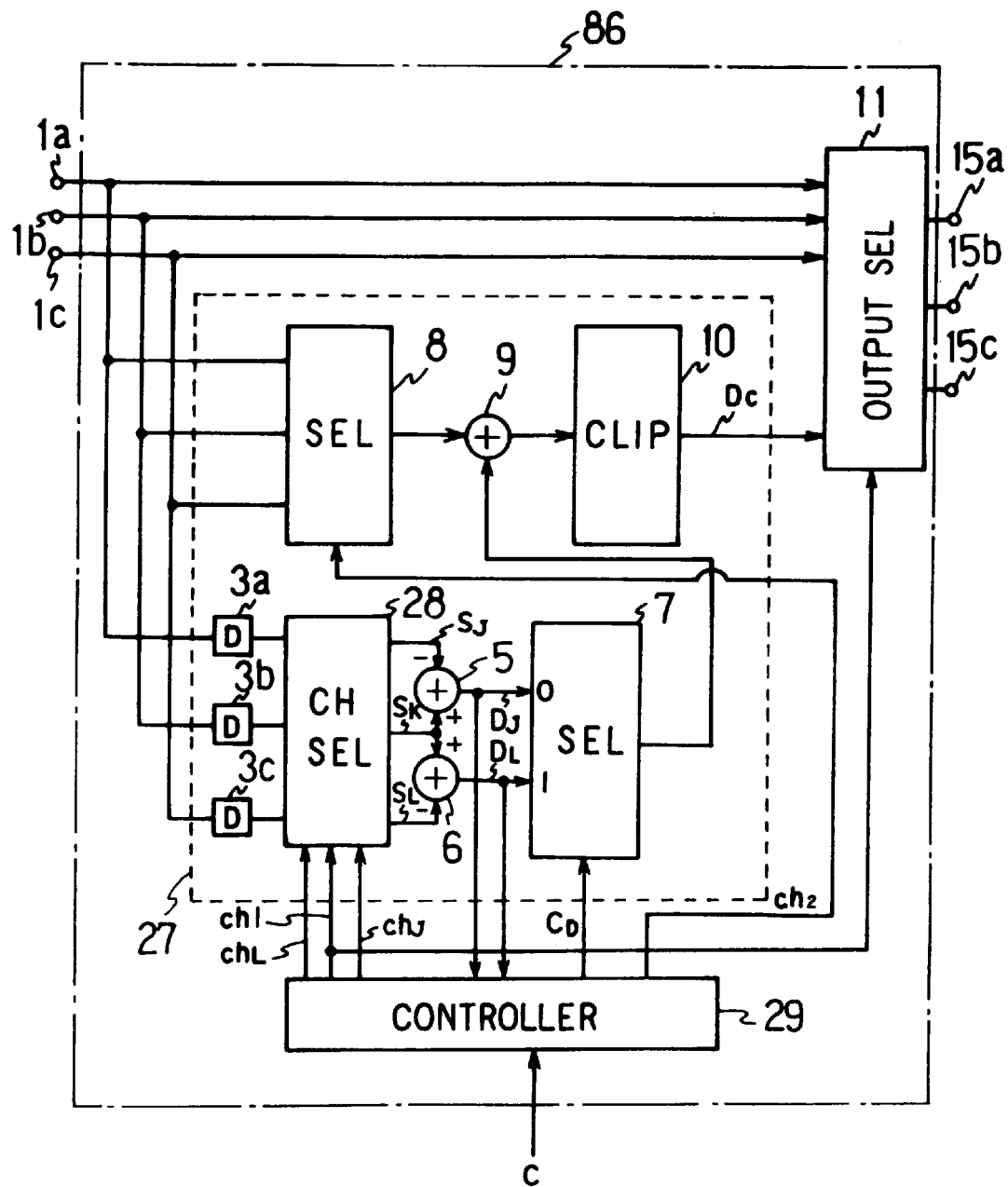
FIG. 8 is a circuit diagram showing a configuration of an error correction apparatus of a second embodiment of the present invention.

FIG. 8 is a circuit diagram showing a configuration of an error correction apparatus of this second embodiment of the present invention. In FIG. 8, the same number is used for the same element shown in FIG. 1. The configuration shown in FIG. 8 is the same shown in FIG. 1 except for a correction data circuit 27 and a controller 29.

Figure 10:
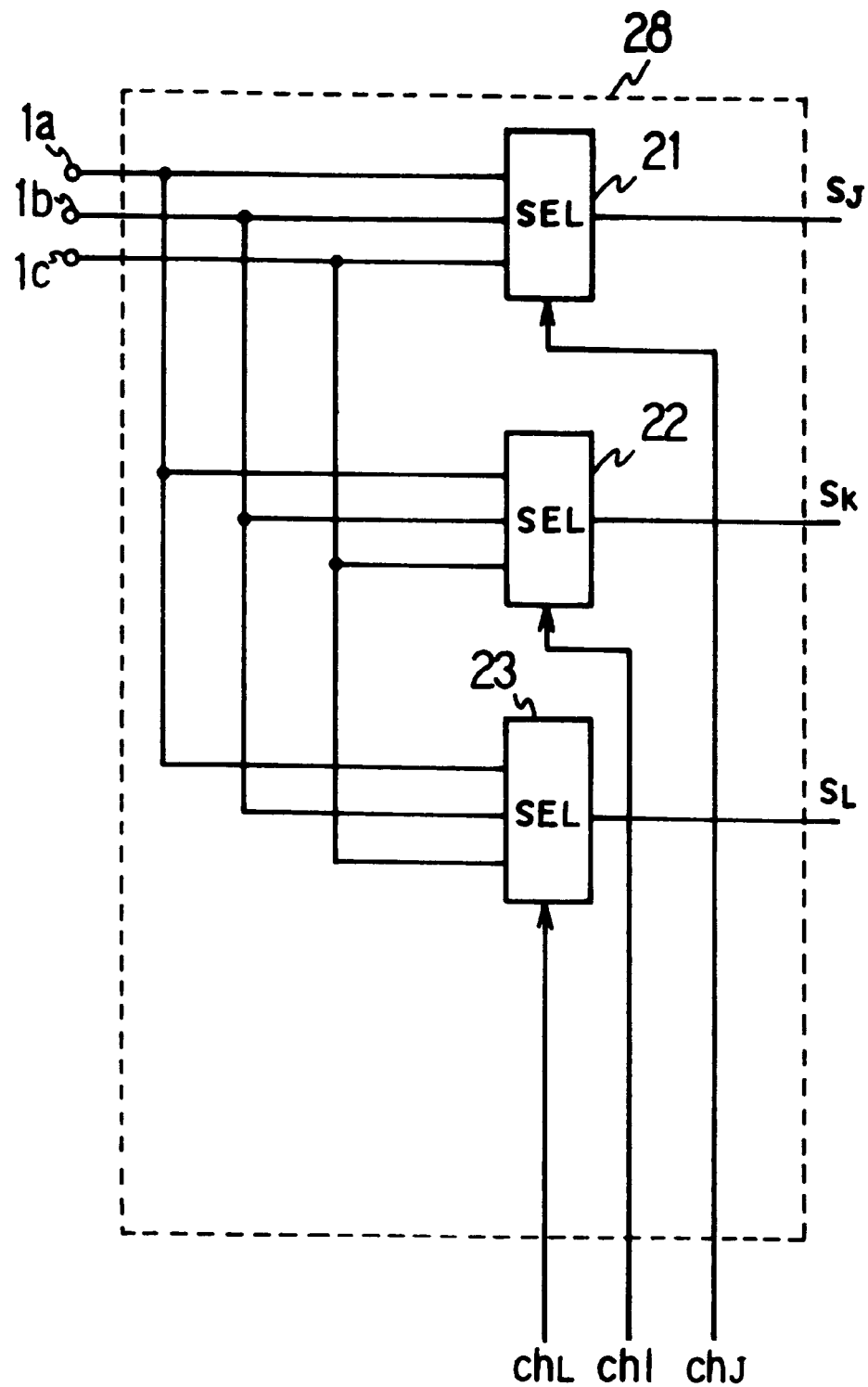
FIG. 10 is a circuit diagram showing a configuration of a channel selector of a second embodiment of the present invention.

First, the correction data circuit 27 is described below. FIG. 10 is a circuit diagram showing the configuration of a channel selector 28. There are selectors 21, 22 and 23. Each signal from the R channel, G channel and B channel is inputted to those respectively. Each selector selects the channel data specified by channel signal $ch_J$, ch1 or $ch_L$ and outputs data as signal $S_J$, $S_K$ or $S_L$. Here, $ch_J$ and $ch_L$ are the errorless channel signals and $S_J$ and $S_L$ are the signals corresponding to the errorless channel signals respectively. Adder 5 and Adder 6 calculate differential signal $D_J$ and $D_L$ according to the Equation 3.

$$D_J=S_k-S_J$$
$$D_L=S_k-S_L \qquad \text{Equation 3}$$

A selector 7 selects and outputs a smaller differential signal from $D_J$ and $D_L$ according to a control signal $C_D$.

Figure 9:
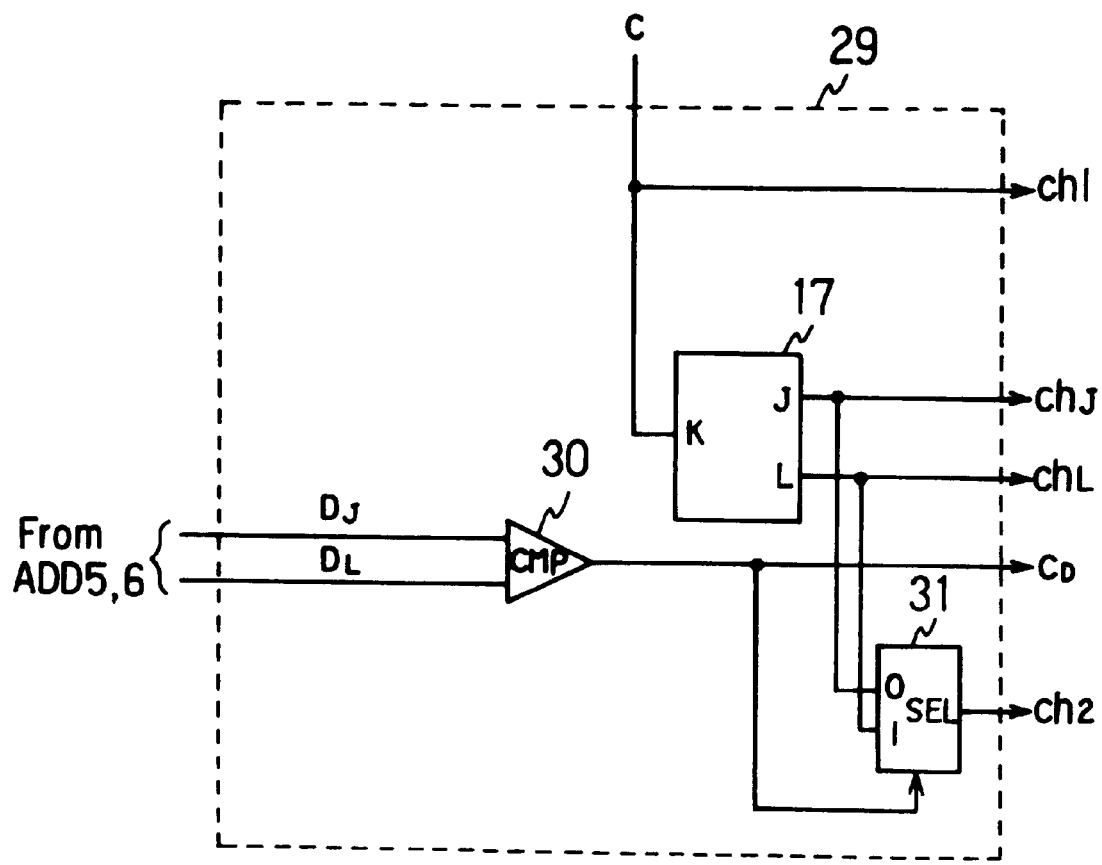
FIG. 9 is a enlarged detail of a circuit diagram of a controller in the error correction apparatus shown in FIG. 8.

Next, a controller 29 is described with reference to FIG. 9. In this embodiment, a controller 29 is formed by adding a comparator 30 and a selector 31 to the controller 12 shown in the first embodiment. A channel signal C is inputted to a channel encoder 17 from the outside and signals of channel J and channel L are outputted as channel signal $ch_J$ and channel signal $ch_L$ respectively. The differential signals $D_J$ and $D_L$ are inputted to comparator 30 from the adders 5 and 6. The comparator 30 outputs a control signal $C_D$ which specifies smaller differential signal in absolute value. That is to say, when $|D_J|<|D_L|$, "0" which specifies channel J is outputted as a control signal $C_D$. On the contrary, when $|D_J|>|D_L|$, "1" which specifies channel L is outputted as a control signal $C_D$. The control signal $C_D$ is inputted to a selector 31 as a select signal. When $C_D$ is "0", channel signal $ch_J$ is outputted as channel signal ch2. When $C_D$ is "1", channel signal $ch_L$ is outputted as channel signal ch2.

The operation of the above-mentioned error correction apparatus of the second embodiment is described with reference to FIG. 7 and FIG. 8 as below.

As described in the first embodiment, "i" is representative of discrete sampled time. R(i), G(i) and B(i) are representative of inputted digital signals of input nodes 1a, 1b and 1c respectively at the time of "i". As in the first embodiment, the signal G(i) is erroneous data and the delay time at each gate except delay elements can be negligible.

First, at the time of "i−1", data R(i−1), G(i−1) and B(i−1) inputted to the output selector 11 via input nodes 1a, 1b and 1c are not erroneous data. Therefore, data R(i−1), G(i−1) and B(i−1) are also outputted from output node of the selector 11 as they are.

Next, at the time of "i", data R(i), G(i) and B(i) are inputted to the output selector 11 via input node 1a, 1b and 1c. At this time, erroneous data G(i) exist. Therefore, channel signals corresponding to R, G and B channel are outputted as $ch_J$, $ch_1$ and $ch_L$ respectively from a controller 29 according to the rule of a channel encoder described in the first embodiment. On the other hand, Data R(i−1), G(i−1) and B(i−1) are inputted to the channel selector 28, and R(i−1), G(i−1) and B(i−1) are outputted as $S_J$, $S_k$ and $S_L$ respectively according to the channel signal $ch_J$, ch1 and $ch_L$. Therefore, subtractor 5 and 6 output differential signals $D_J$ and $D_L$ by calculating {G(i−1)−R(i−1)} and {G(i−1)−B(i−1)}. These differential signal $D_J$ and $D_L$ are inputted to a selector 7 and a controller 29. A controller 29 selects smaller differential signal in absolute value. When the signal levels are as shown in FIG. 7, |G(i−1)−R(i−1)| is larger than |G(i−1)−B(i−1)|, and control signal $C_D$=1 is inputted to a selector 7. The selector 7 selects and output the differential signal $D_L$=G(i−1)−B(i−1) to adder 9 according to the control signal $C_D$. This means that the B channel is selected as the channel for data correction and channel signal ch2 which specifies B channel is inputted from controller 29 to a selector 8. An adder 9 calculates G'(i) according to following Equation 4 based on signal B(i), and correction data $D_c$ is obtained via clip circuit 10.

$$G'(i)=B(i)+\Delta V=B(i)+G(i-1)-B(i-1) \qquad \text{Equation 4}$$

An output selector 11 replaces erroneous data G(i) with the correction data shown by Equation 4 and outputs the correction data as shown in a first embodiment.

When the R channel or B channel has erroneous data, the above-mentioned process will be taken in the same manner.

According to this second embodiment, an appropriate data correction can be achieved when there are only two channel signals with non-zero values around erroneous data.

Third Embodiment

In the first embodiment and the second embodiment, data correction processes are described on the condition that a differential value between each channel signal is a constant value around erroneous data. However, in the case of the edges of a subject in a color picture, much difference between a differential value $\Delta V_{i-1}$ at "i−1" and a differential value $\Delta V_i$ at "i" can be possible as shown by the G channel and B channel in FIG. 11.

In the above-mentioned case, correction data generated by steps shown in a second embodiment will be different from true data. For example, if G(i) are erroneous data, correction data for erroneous data G(i) will be calculated as {B(i)+$\Delta V_{i-1}$} by Equation 4. This correction data value is obviously different from the true value. This third embodiment will work on such data correction process by calculating $\Delta V$ based on a mean value of both sides data with respect to the erroneous data instead of calculation based on one side data as shown in the second embodiment.

Figure 12:
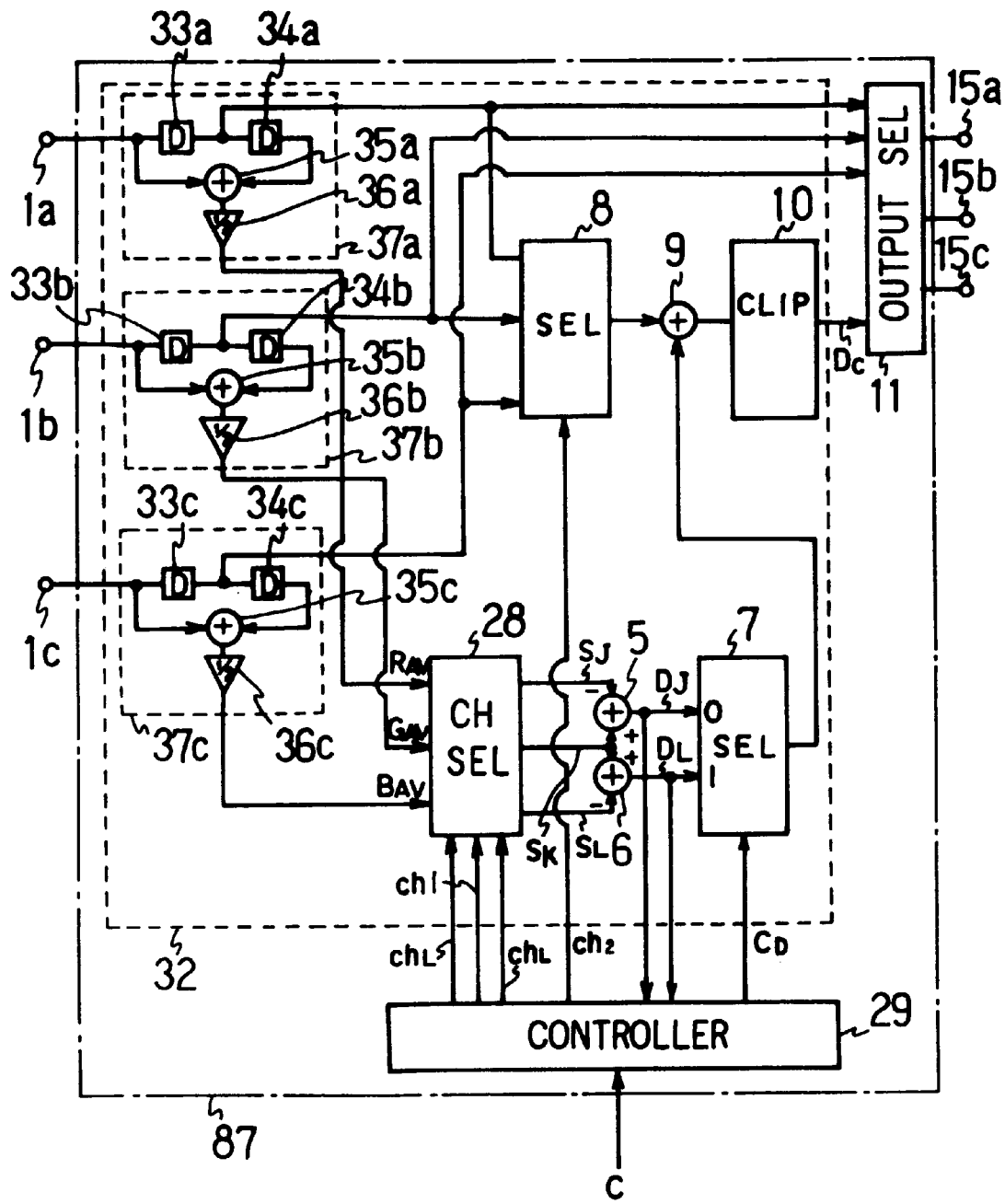
FIG. 12 is a circuit diagram showing a configuration of an error correction apparatus of a third embodiment of the present invention.

FIG. 12 is a circuit diagram showing a configuration of an error correction apparatus of a third embodiment of the present invention. In FIG. 12, an output selector and a controller are basically the same elements shown in a second embodiment, provided that a channel signal C outputs a channel code which corresponds to an erroneous data when next signal of erroneous data is inputted to the input nodes 1a, 1b and 1c.

There is a data correction circuit 32, in which the same number is used for the same element in the correction data circuit 10 of the second embodiment. D flip-flop delay circuits 33a, 33b and 33c delay R, G and B signals from input nodes 1a, 1b and 1c for one data period, and output signals will be inputted to an output selector 11 and selector 8 respectively. D flip-flop delay circuits 34a, 34b and 34c delay output signals from the delay circuits 33a, 33b and 33c for one further period. Adders 35a, 35b and 35c add R, G, B signals from input nodes 1a, 1b, 1c and output signals from delay circuits 34a, 36b, 36c respectively. Amplifiers 36a, 36b and 36c reduce the inputted signals in half by bit-shifting. A mean value circuit 37a corresponding to the R channel is composed of delay circuits 33a and 34a, adder 35a and amplifier 36a. In the same way, a mean value circuit 37b corresponding to the G channel is composed of delay circuit 33b and 34b, adder 35b and amplifier 36b, and a mean value circuits 37c corresponding to the B channel is composed of delay circuits 33c and 34c, adder 35c and amplifier 36c. Finally, output signals from these mean value circuits 37a to 37c are inputted to a channel selector 28. In the above-mentioned configuration, delay circuits 33a, 33b and 33c work not only as a part of mean value circuit but also as a phase shifting and adjusting circuit for input signals of an output selector 11. Other elements and circuits of the correction data circuit 32 are the same as those in the second embodiment, and descriptions for those are ommitted.

Figure 11:
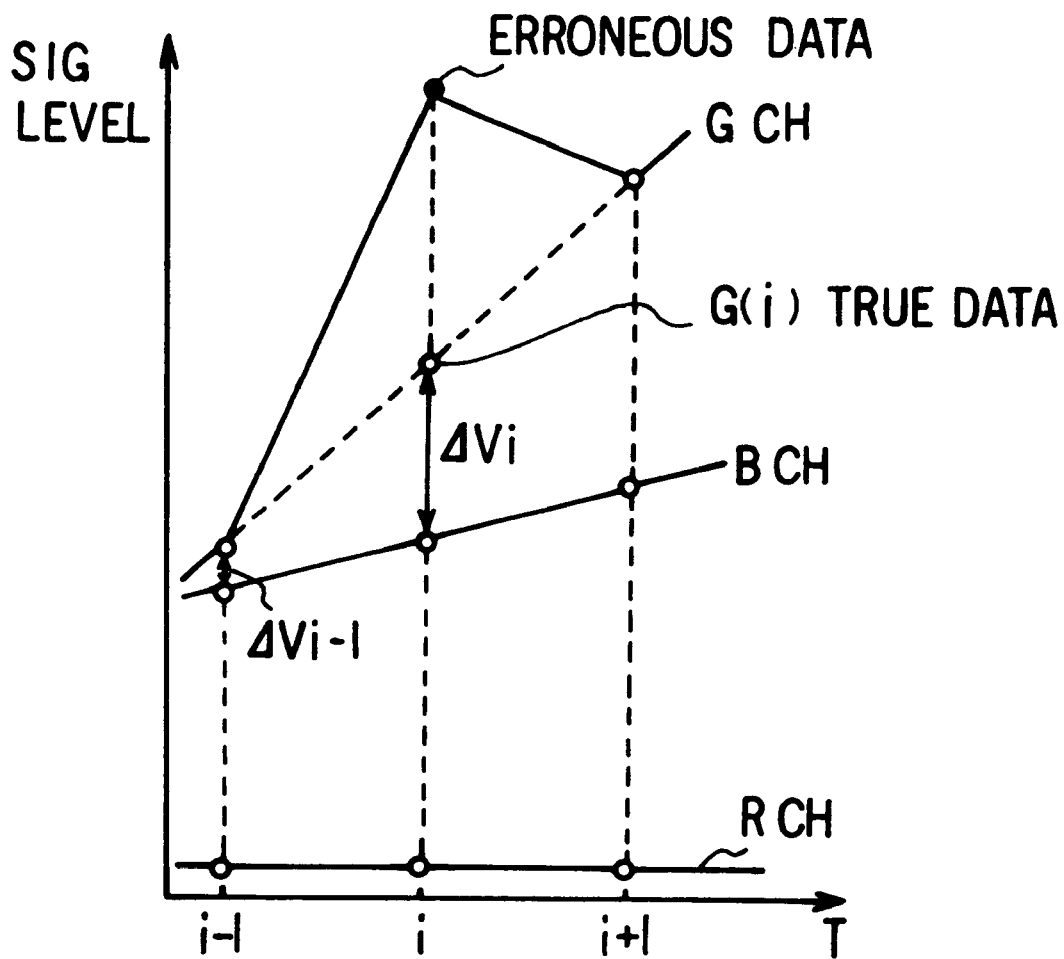
FIG. 11 is a conceptual graph showing input data of an error correction apparatus of a third embodiment of the present invention.

The operation of the above-mentioned error correction apparatus of the third embodiment is described with reference to FIG. 12 as below. In the following description, input signals are shown in FIG. 11 and signal G(i) is taken as erroneous data. Delay time at the each gate except delay elements can be negligible.

At the time "i", R(i), G(i) and B(i) are inputted from input nodes 1a, 1b and 1c respectively, and R(i−1), G(i−1) and B(i−1) are inputted to the output selector 11. The channel signal C is "00" at the time "i". Therefore, data R(i−1), G(i−1) and B(i−1) are also outputted from output nodes of the selector 11 as they are.

Next, at the time of "i+1", data R(i+1), G(i+1) and B(i+1) are inputted to the input nodes 1a, 1b and 1c respectively, and data R(i), G(i) and B(i) are inputted to the output selector 11 and selector 8. The mean value circuit 37a, 37b and 37c calculate the following $R_{AV}$, $G_{AV}$ and $B_{AV}$ and output them to the channel selector 28.

$$R_{AV} = 1/2*\{R(i+1)+R(i+1)\} \qquad \text{Equation 5}$$
$$G_{AV} = 1/2*\{G(i+1)+G(i-1)\}$$
$$B_{AV} = 1/2*\{B(i+1)+B(i-1)\}$$

On the other hand, the G channel code corresponding to the erroneous data G(i) is inputted to the controller 29 as a channel signal C as mentioned before. Consequently, R, G and B channel signals are outputted as $ch_J$, ch1 and $ch_L$ respectively. $D_J$ and $D_L$ are calculated in the same way as at the time "i" of the second embodiment. As shown in FIG. 11, the following relationship will be satisfied.

$$D_J=G_{AV}-B_{AV}<D_L=G_{AV}-R_{AV} \qquad \text{Equation 6}$$

The controller 29 outputs "1" which specifies L side as a control signal $C_D$, and a differential signal calculated by following Equation 7 is outputted from the selector 7.

$$D_L=G_{AV}-B_{AV}=\tfrac{1}{2}*\{G(i+1)+G(i-1)\}-\tfrac{1}{2}*\{B(i+1)+B(i-1)\} \qquad \text{Equation 7}$$

The selector 8 outputs signal B(i) according to channel signal ch2, and the adder 9 calculates signal G'(i) by the following Equation 8.

$$G'(i) = B(i)+\Delta V = B(i)+G_{AV}-B_{AV} \qquad \text{Equation 8}$$
$$= B(i)+1/2*\{G(i+1)+G(i-1)\} -$$
$$1/2*\{B(i+1)+B(i-1)\}$$

As shown above, a correction data $D_c$ will be outputted from the clip circuit 10.

The output selector 11 outputs picture image data by replacing erroneous data G(i) with the correction data calculated by the Equation 8. This correction data are equivalent to the true data shown as FIG. 11. According to this third embodiment, fine correction can be achieved for a color pattern change at the edge of a subject. Furthermore, as we can see by comparing Equation 4 with Equation 8, Equation 8 can achieve 3 dB improvement in the S/N ratio of the differential value $\Delta V$. S/N ratio improvement can be achieved at the same time in addition to the data correction. Furthermore, this third embodiment can be applied to a high frequency data pattern as shown by FIG. 4 and FIG. 7 described in the first embodiment and the second embodiment.

Fourth Embodiment

In this embodiment, fine data correction in case that erroneous data are in a high frequency color data pattern is described (provided that chromaticity, that is a ratio between each channel signal, is constant).

Figure 14:
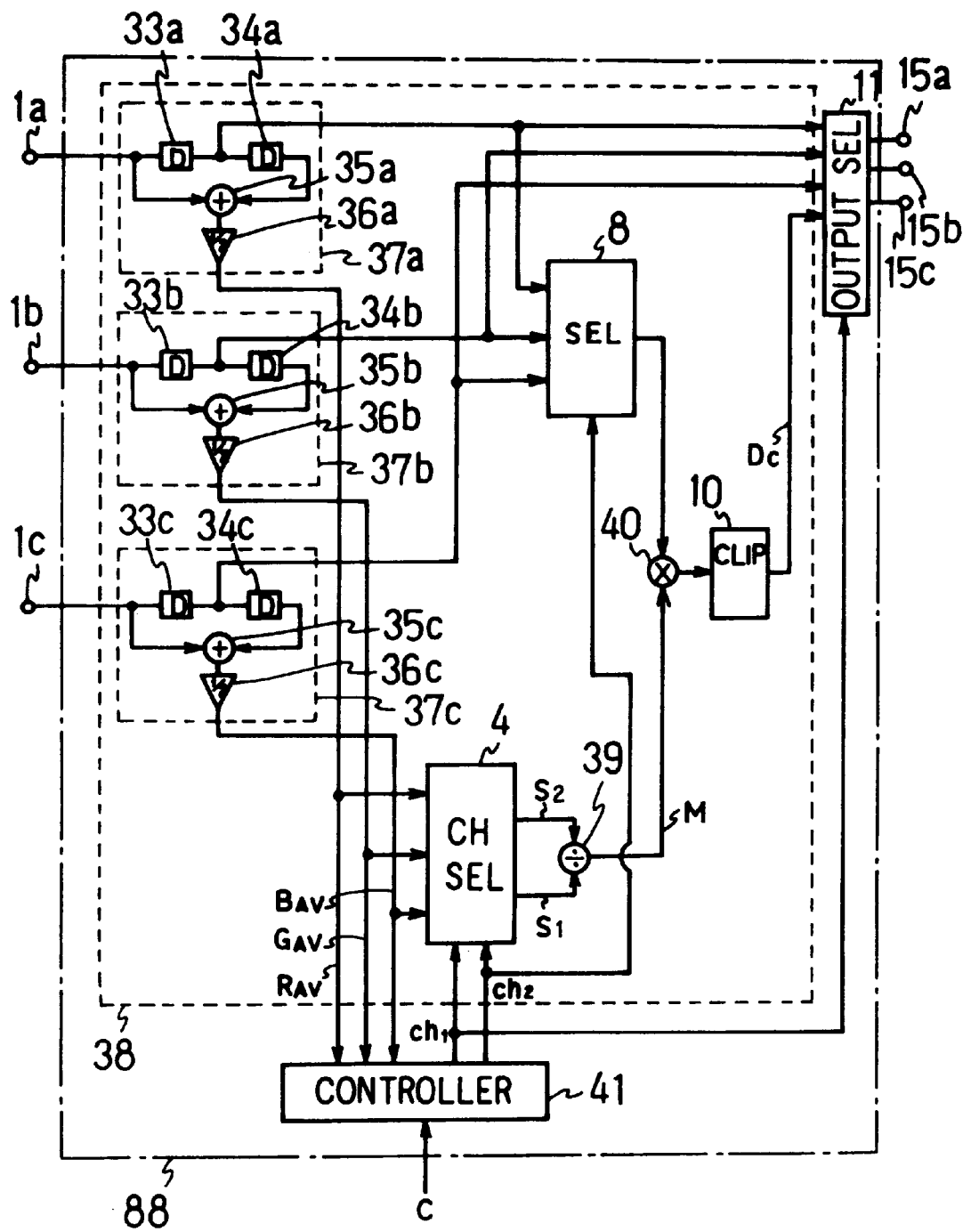
FIG. 14 is a circuit diagram showing a configuration of an error correction apparatus of a fourth embodiment of the present invention.

FIG. 14 is a circuit diagram showing a configuration of an error correction apparatus of a fourth embodiment of the present invention. In FIG. 14, the same number is used for the same element shown in FIG. 1 and FIG. 12. There is a correction data circuit 38. This circuit 38 has a channel selector 4 which is the same as that shown in FIG. 5. In this embodiment, output signals of selector 21 and 22 are outputted as S2 and S1. S1 is erroneous data, and S2 is correction data corresponding to the S1. Furthermore, there is a division circuit 39 including ROM, which reads and outputs the following value M when signals S1 and S2 from the channel selector 4 are inputted.

$$M = S1/S2 \qquad \text{Equation 9}$$

Furthermore, there is a multiplier 40 multiplying the output signal M from division circuit 39 and the output signal from the selector 8.

Figure 15:
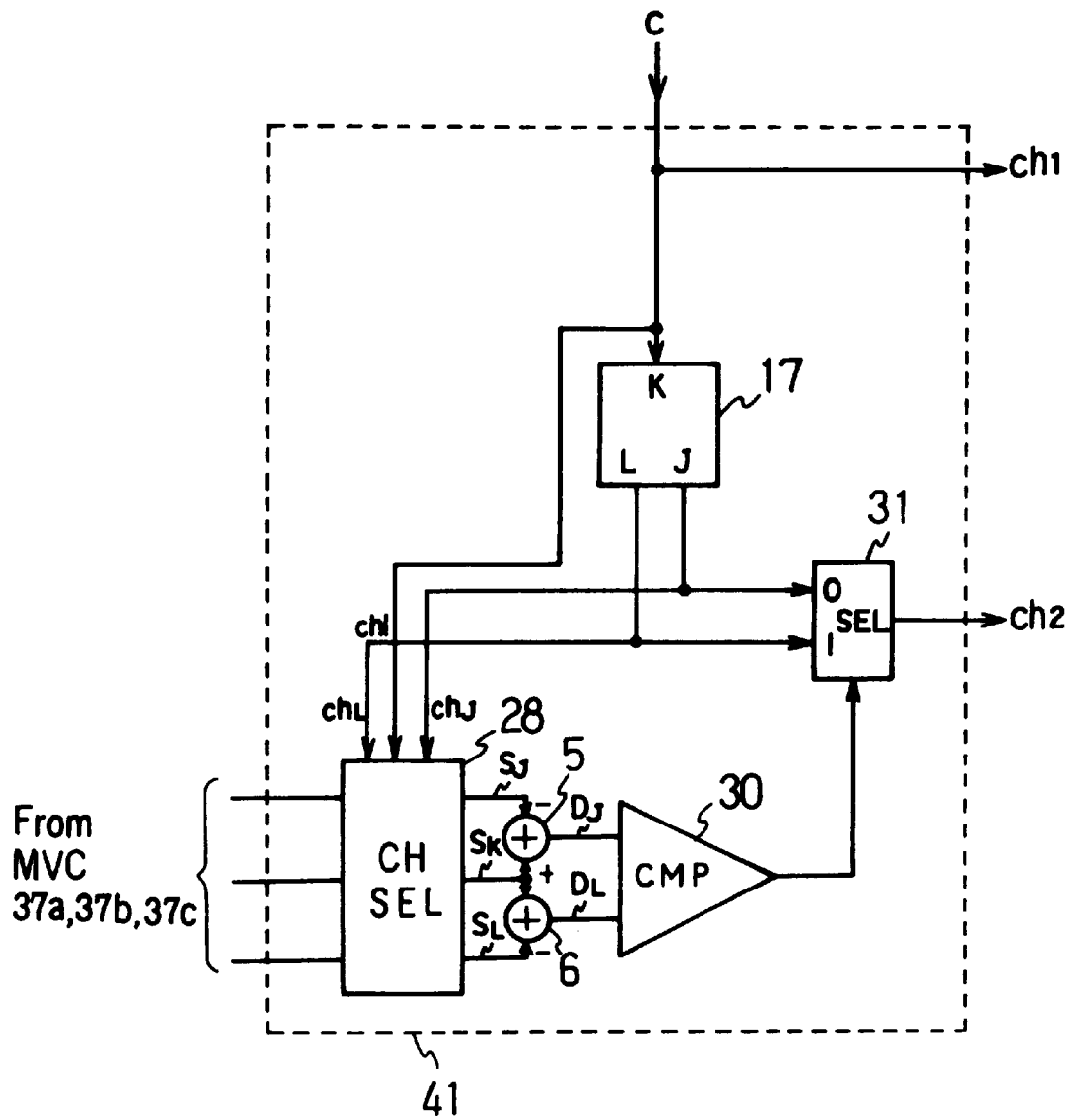
FIG. 15 is an enlarged detail of a circuit diagram of a controller in the error correction apparatus shown in FIG. 14.

A configuration of the controller 41 is described with reference to FIG. 15. As shown in FIG. 15, the controller 41 has a configuration in which three modules, a channel selector 28, an adder 5 and an adder 6, which are parts of the correction data circuit 32 in FIG. 12 described in the third embodiment, are added to the control circuit 29, which is shown in FIG. 9. This configuration differs from that of the third embodiment in the configuration for the select signal to the selector 31. Mean values of output signals from R, G and B channels are inputted to the channel selector 28, and differential signals $D_J$ and $D_L$ are calculated by adder 5 and 6 based on the mean values $S_J$, $S_K$ and $S_L$ and inputted to the comparator 30. The output signal from the comparator 30 will be a select signal for the selector 31. The controller 41 outputs only ch1 and ch2 as channel signals.

Figure 13:
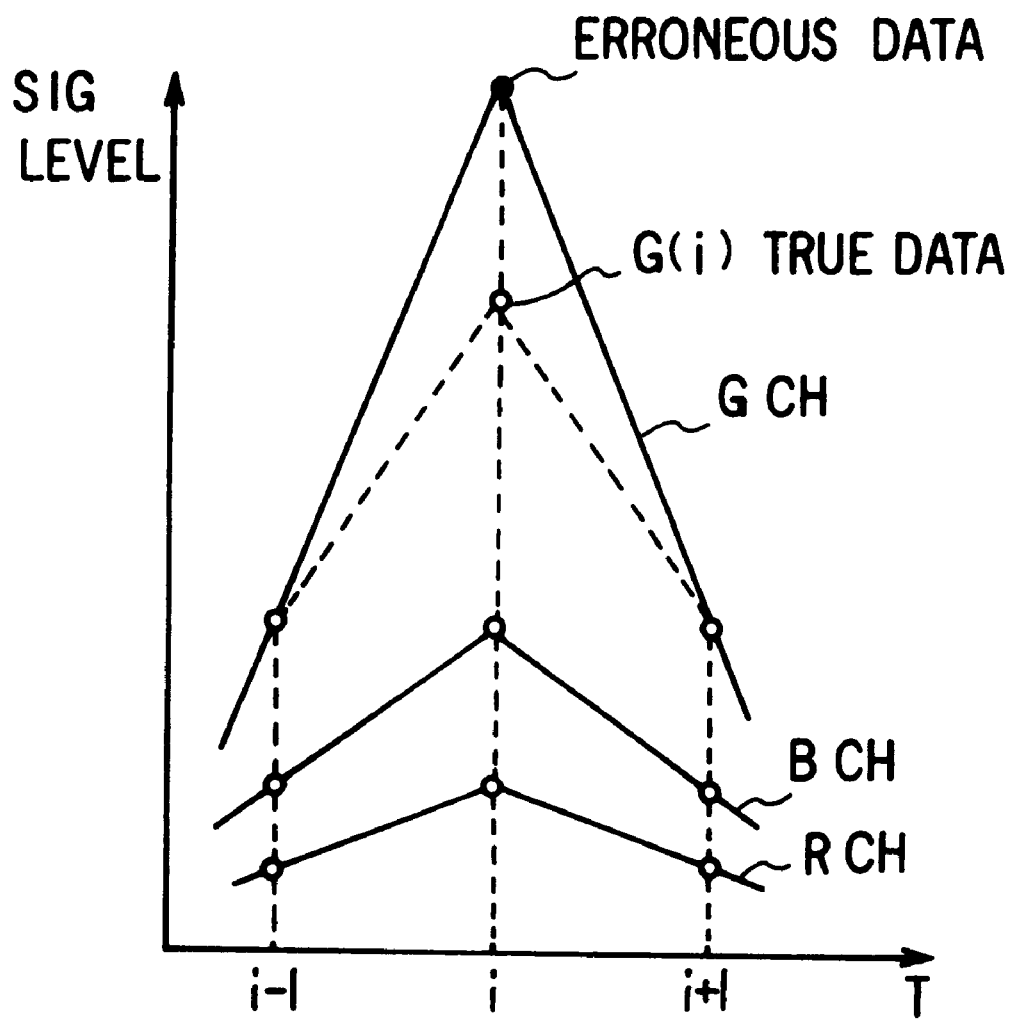
FIG. 13 is a conceptual graph showing input data of an error correction apparatus of a fourth embodiment of the present invention.

The operation of the above-mentioned error correction apparatus of the fourth embodiment is described with reference to FIG. 14 as below. In the following description, input signals are shown in FIG. 13 and signal G(i) is taken as erroneous data.

The operation at the time "i" is the same as that of the third embodiment, and an output selector 11 outputs signals R(i−1), G(i−1) and B(i−1).

Next, at the time "i+1", signals R(i+1), G(i+1) and B(i+1) are inputted to input nodes 1a, 1b and 1c respectively and signals R(i), G(i) and B(i) are inputted to both the output selector 11 and selector 8. Mean values of R, G and B signals calculated by the Equation 5 are inputted to the channel selector 4 and a controller 41. In this case, input signals shown as FIG. 13 satisfy the following Equation 10, and channel signals corresponding to G and B channel are outputted as channel signals ch1 and ch2 respectively in the same way as the third embodiment.

$$D_I = G_{AV} - B_{AV} < D_J = G_{AV} - R_{AV} \qquad \text{Equation 10}$$

Therefore, the channel selector 4 outputs $G_{AV}$ and $B_{AV}$ as S1 and S2, and a division circuit 39 outputs a signal which has a signal ratio M shown in the below Equation 11 to a multiplier 40.

$$M = G_{AV}/B_{AV} = \{G(i+1)+G(i-1)\}/\{B(i+1)+B(i-1)\} \qquad \text{Equation 11}$$

The multiplier 40 multifies the above signal ratio M and the signal B(i) outputted from the selector 8, and G'(i) shown as below Equation 12 will be calculated.

$$G'(i) = B(i)*M = B(i)*G_{AV}/B_{AV} = B(i)*\{G(i+1)+G(i-1)\}/\{B(i+1)+B(i-1)\} \qquad \text{Equation 12}$$

The above G'(i) is inputted to a clip circuit 10 and correction data Dc will be outputted therefrom. In this way, the output selector 11 outputs corrected data by replacing an erroneous data G(i) with a correction data G'(i) as shown by Equation 12. This correction data will be equivalent to true value $G_o(i)$ on the condition that there is no chromaticity variation, that is following Equation 13 is satisfied.

$$R(i-1):G(i-1):B(i-1)=R(i):G_o(i):B(i)=R(i+1):G(i+1):B(i+1) \qquad \text{Equation 13}$$

Where G'(i) is a true vale for erroneous data G(i).

According to this fourth embodiment, data correction can be carried out accurately even in the case of high a frequency data pattern color picture with constant chromaticity.

Figure 7:
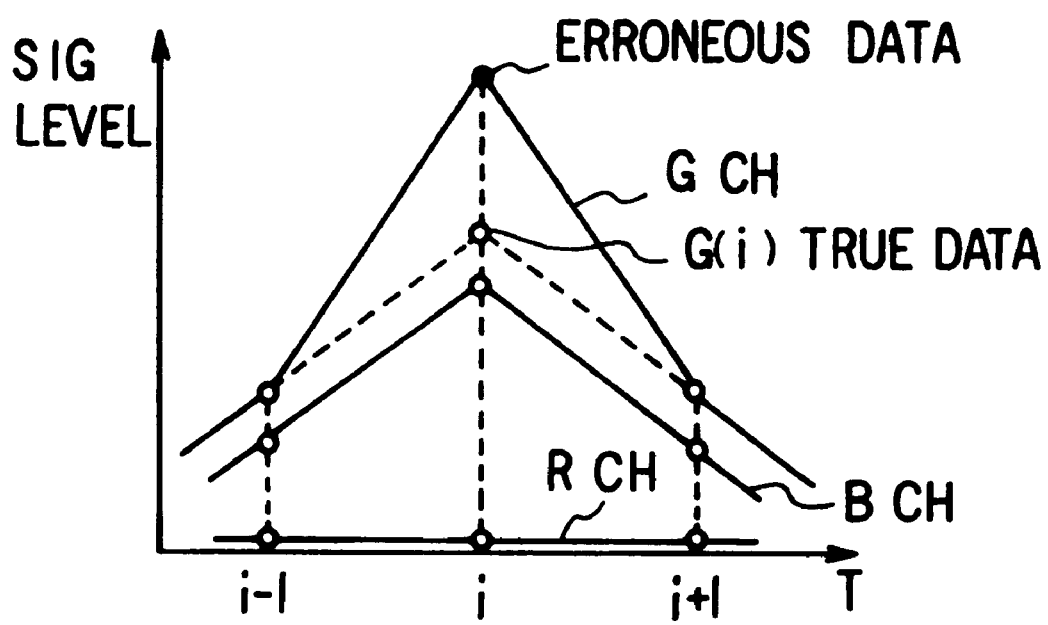
FIG. 7 is a conceptual graph showing input data of an error correction apparatus of a second embodiment of the present invention.

Furthermore, this fourth embodiment can be applied to data patterns shown by FIG. 4, FIG. 7 and FIG. 11 described in the first embodiment, the second embodiment and the third embodiment.

Fifth Embodiment

Figure 16:
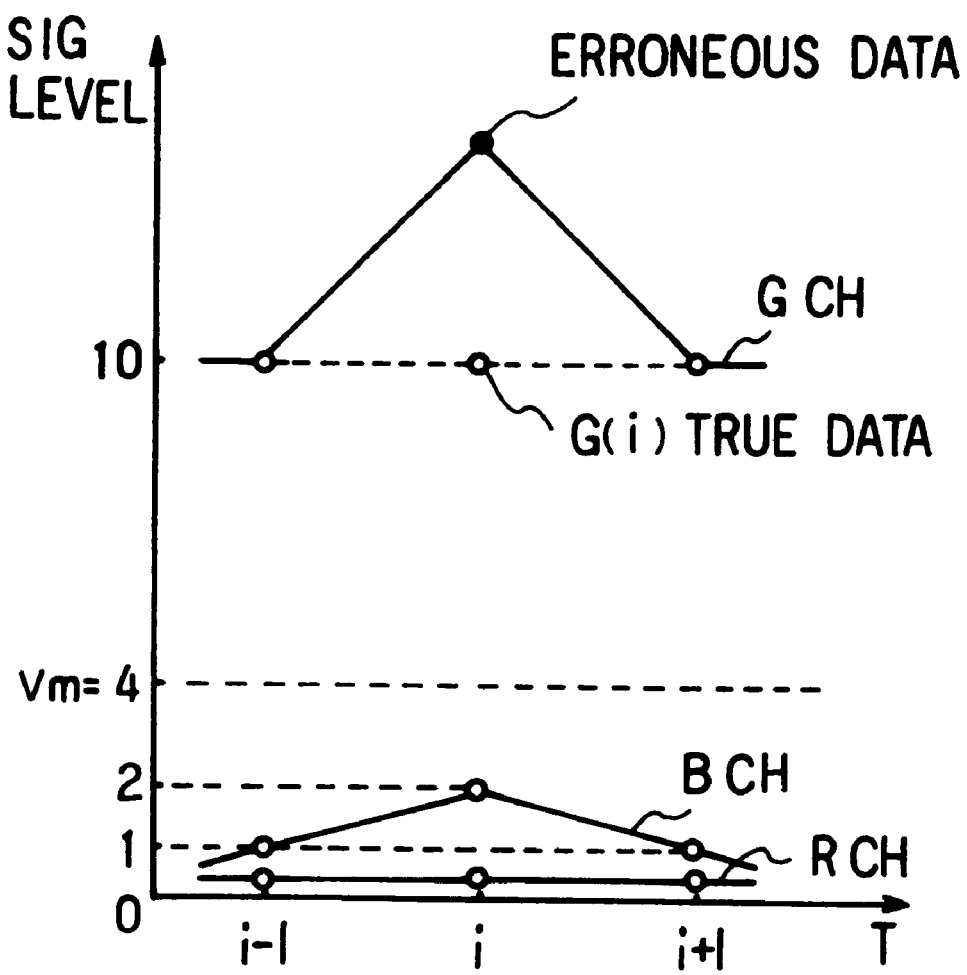
FIG. 16 is a conceptual graph showing input data of an error correction apparatus of a fifth embodiment of the present invention.

In the fourth embodiment, when the input data pattern is as shown in FIG. 16 and G(i) is taken to be erroneous data, correction data G'(i) will be calculated as 20 by the below Equation 14.

$$G'(i) = B(i)*\{G(i+1)+G(i-1)\}/ \qquad \text{Equation 14}$$
$$\{B(i+1)+B(i-1)\}$$
$$= 2*(10+10)/(1+1)$$
$$= 20$$

This means the correction data G'(i) are different from the true value "10" greatly. The cause of this discrepancy comes from the input picture data pattern shown as FIG. 16 not satisfying the relationship described by Equation 13. This case will happen when the input picture data pattern around erroneous data consists of only a certain primary color (G channel signal). Therefore, this fifth embodiment provides an improved process that selecting a correction data shown by FIG. 12 when a mean value of both contiguous channels to the erroneous channel is larger than a set value, and selecting a correction data as a mean value of both contiguous channels to the erroneous channel.

Figure 17:
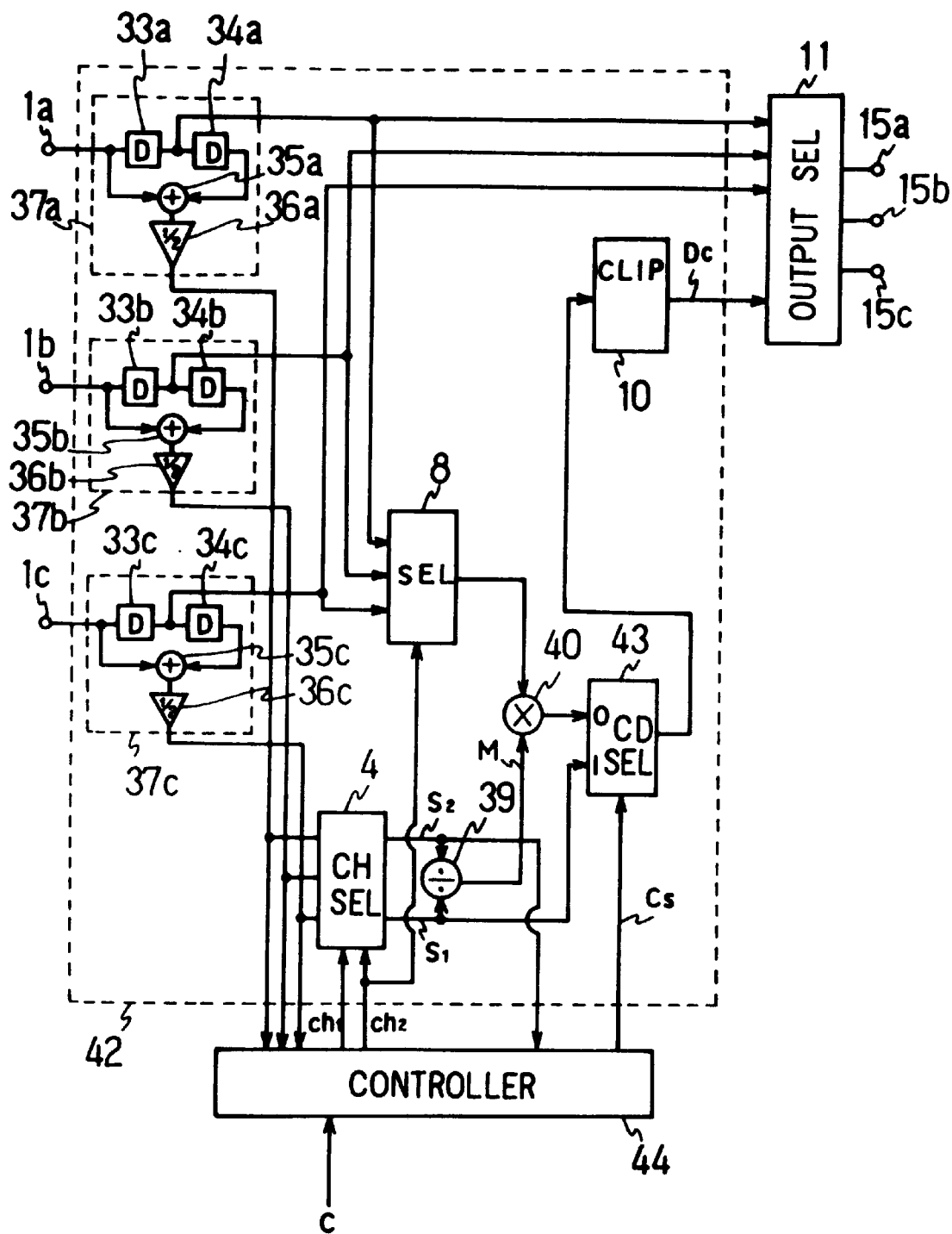
FIG. 17 is a circuit diagram showing a configuration of an error correction apparatus of a fifth embodiment of the present invention.

FIG. 17 is a circuit diagram showing a configuration of an error correction apparatus of this fifth embodiment of the present invention. In FIG. 14, the same number is used for the same element shown in FIG. 14, and an output selector 11 is the same as that of the fourth embodiment.

Figure 18:
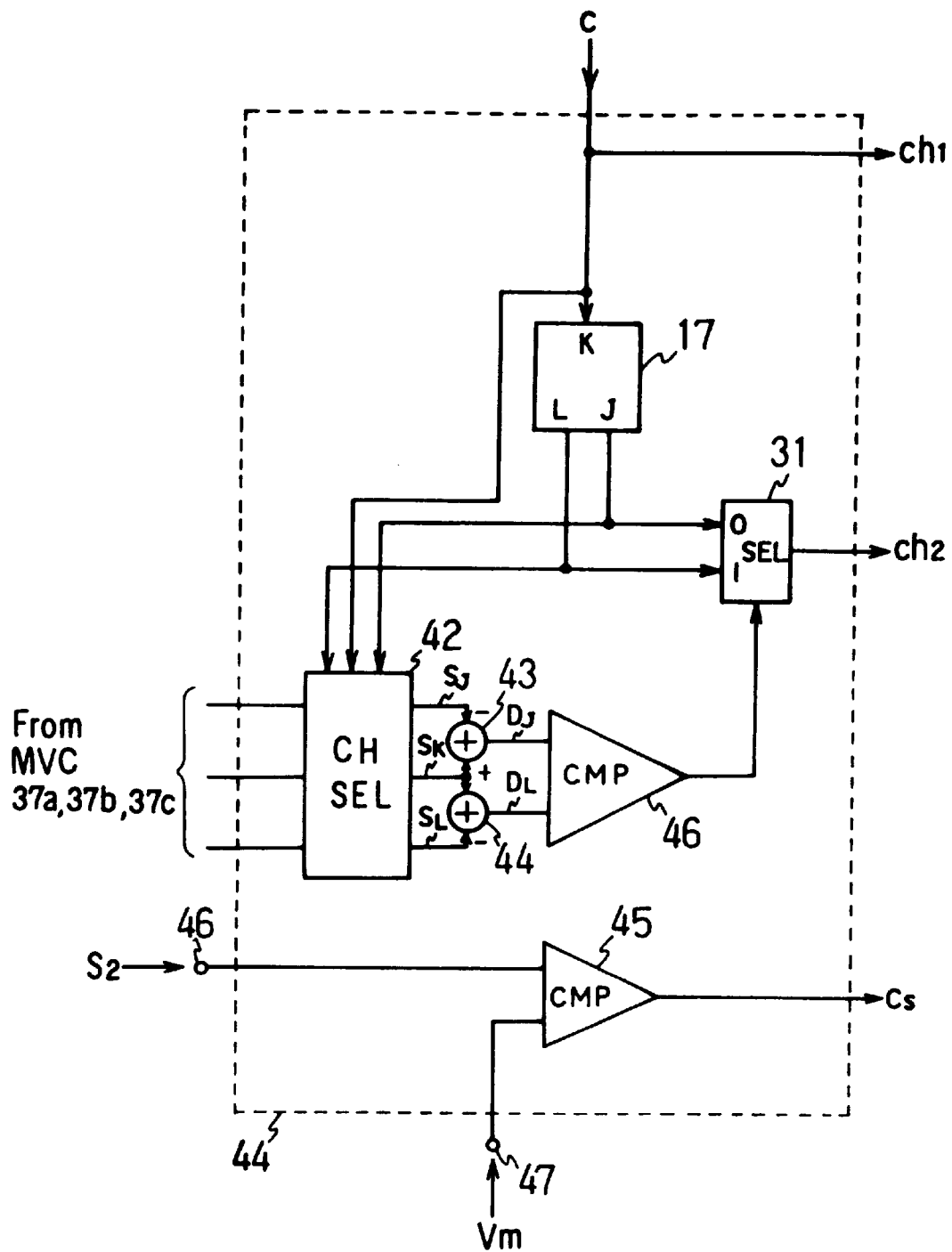
FIG. 18 is an enlarged detail of a circuit diagram of a controller in the error correction apparatus shown in FIG. 17.

There is a correction data circuit 42. This circuit 42 is the same as the correction data circuit 38 in FIG. 14 except for a correction data select circuit 43 being added thereto. The correction data select circuit 43 is a selector which outputs a signal from a multiplier 40 or a signal S1 from a channel selector 4 selectively according to a control signal Cs from controller 44. FIG. 18 is a circuit diagram of the controller 44. It is the same as the controller 41 in FIG. 15 except for a comparator 45 being added thereto. An output signal S2 from the channel selector 4 is inputted to one of the input node 46 of the comparator 45, a threshold value Vm is inputted to the other input node of the input node 47. When S2>Vm, "0" is outputted as a control signal Cs, and when S2<Vm, "1" is outputted as a control signal Cs. For example, the threshold value Vm is set as 4 in the following description.

The operation of the above-mentioned error correction apparatus of the fifth embodiment is described with reference to FIG. 16 to FIG. 18 below. In the following description, input signals are shown in FIG. 16 and signal G(i) is taken as erroneous data.

The operation at the time "i" is the same as that of the fourth embodiment, and an output selector 11 outputs signals R(i−1), G(i−1) and B(i−1).

Next, at the time "i+1", the operation of the fourth embodiment is followed from the step where signals R(i+1), G(i+1) and B(i+1) are inputted to input nodes 1a, 1b and 1c respectively to the step where correction data G'(i) calculated by Equation 12 is output from multiplier 40. Therefore, G'(i) and signal S1 which is {G(i−1)+G(i+1)}/2 are inputted to a correction data selector 43. On the other hand, signal S2 which is {B(i−1)+B(i+1)}/2 is inputted to the controller 44 and a select signal Cs from correction data selector 43 becomes 1 because S2 (which is 2)<Vm (which is 4). Consequently, signal G"(i) calculated by the below Equation 15 is outputted from the correction data selector 43, and it will be outputted as correction data in the same way shown in the fourth embodiment.

$$G"(i)=\{G(i-1)+G(i+1)\}/2 \qquad \text{Equation 15}$$

This correction data G"(i) is equivalent to the true value G(i) shown in FIG. 16. Therefore, an appropriate data correction can be carried out. When input data are as previously shown in FIG. 13, in which the B channel signal is larger than the threshold, normally FIG. 13 will be satisfied. Therefore, a accurate data correction can be carried out with correction data calculated by Equation 12. According to this fifth embodiment, precise data correction can be carried out not only for a general color picture image in the same way described in the fourth embodiment, but also for special color picture image pattern consisting of one primary color and not satisfying FIG. 13 on the condition of low frequency.

Sixth Embodiment

This embodiment provides another data correction for a picture image as previously shown in FIG. 16. In this embodiment, when signal ratio M shown by FIG. 11 is smaller than a set threshold, correction data calculated by Equation 12 is selected as correction data by supposing there is relationship between both channels, and when signal ratio M is larger than the set threshold, correction data calculated by Equation 15 is selected as correction data by supposing there is no relationship between both channels.

Figure 19:
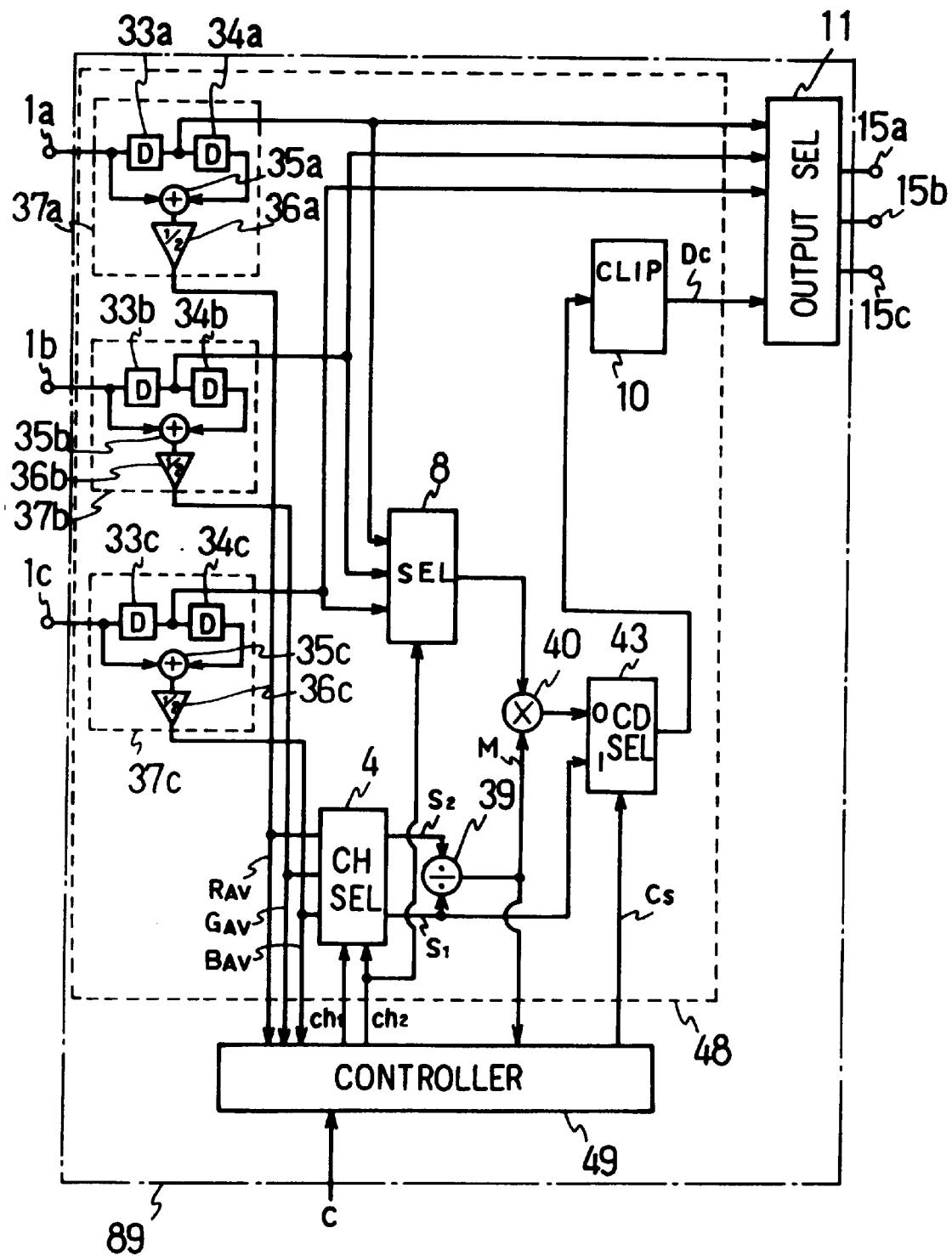
FIG. 19 is a circuit diagram showing a configuration of an error correction apparatus of a sixth embodiment of the present invention.

FIG. 19 is a circuit diagram showing a configuration of an error correction apparatus of a sixth embodiment of the present invention. In FIG. 19, the same number is used for the same element shown in FIG. 17, and a correction data circuit 48 is the same as a correction data circuit 42 in FIG. 17 except for an output signal M from a division circuit 39 being inputted to a controller 49. The configuration of the controller 49 is basically the same configuration shown in FIG. 18. However, in this embodiment, output signal M from division circuit 39 is inputted to an input node 46 and a set threshold value Vt is inputted to an input node 47, and a comparator 45 compares Vt and M. When M<Vt, 0 is outputted as a control signal Cs and when M>Vt, 1 is outputted as a control signal Cs. For example, the threshold value Vm is set as 4 in the following description.

The operation of the above-mentioned error correction apparatus of the sixth embodiment is described with reference to FIG. 16 and FIG. 19 as below. In the following description, input signals are shown in FIG. 16 and signal G(i) is taken as erroneous data.

The operation at the time "i" is the same as that of the fifth embodiment, and an output selector 11 outputs signals R(i−1), G(i−1) and B(i−1).

Next, at the time "i+1", the operation of the fifth embodiment is followed from the step that signals R(i+1), G(i+1) and B(i+1) are inputted to input nodes 1a, 1b and 1c respectively to the step that signal ratio M calculated by Equation 11 is output from a division circuit 39. As shown in FIG. 16, M is larger than Vt because M is 10. Therefore, a control signal Cs is outputted as "1" from the controller 49. Consequently, a signal calculated by Equation 15 is outputted from the correction data selector 43. The following steps are the same as those of the fifth embodiment.

Figure 20:
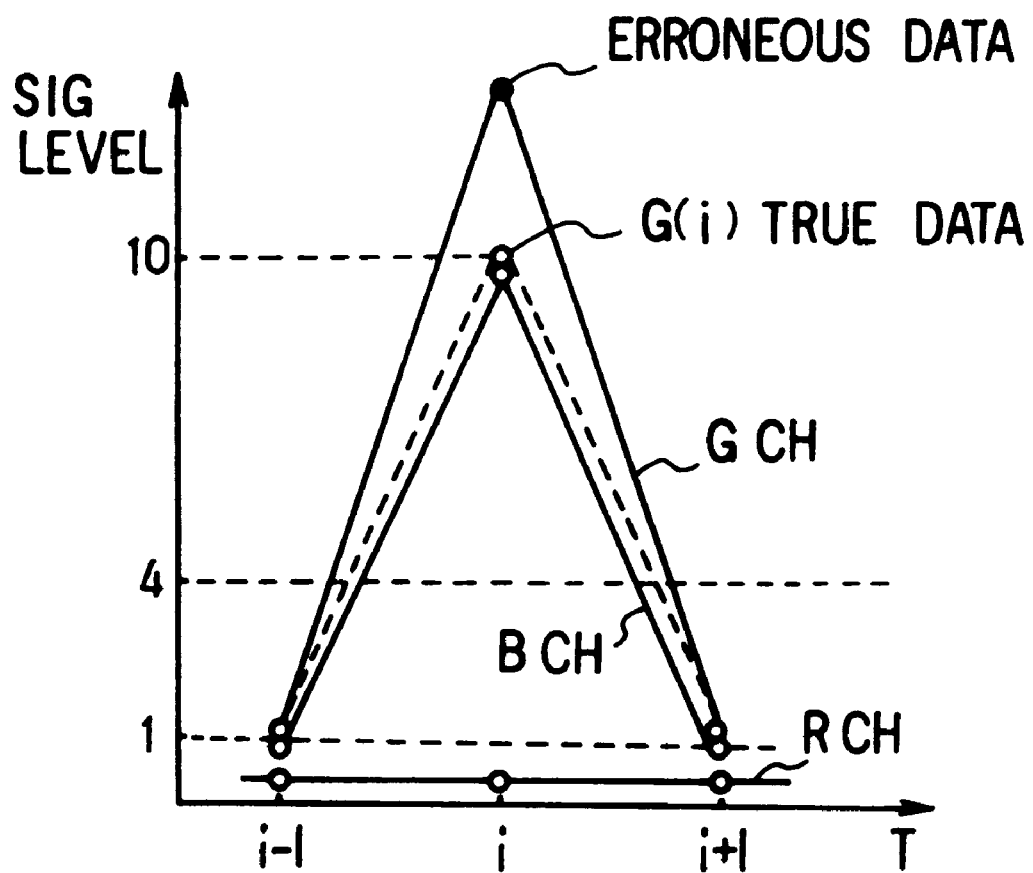
FIG. 20 is a conceptual graph showing input data which can not be corrected appropriately by the error correction apparatus of the fifth embodiment and can be corrected appropriately by the error correction apparatus of the sixth embodiment of the present invention.

As shown above, according to this sixth embodiment in addition to a fifth embodiment, precise data correction can also be carried out for a special color picture image pattern consisting of one primary color and not satisfying FIG. 13 on the condition of low frequency. Furthermore, this sixth embodiment is superior to the fifth embodiment in correction effectiveness for an achromatic color picture image and a picture image that has a relationship to both channels, because the correction data are selected according to the signal ratio M in this embodiment. For example, in the fifth embodiment, when a set threshold value Vm is 4, appropriate data correction for input signal shown as FIG. 16 can be possible as described before. However, appropriate data correction for an input signal shown in FIG. 20 can not be possible because the correction data is calculated by Equation 15. On the other hand, in this sixth embodiment, when the input signal is as shown in FIG. 16, Equation 15 is applied for data correction and when the input signal is as shown in FIG. 20, Equation 12 is applied for data correction. Therefore, appropriate data correction can be supplied.

Seventh Embodiment

In the sixth embodiment, when input data is a static image, a signal ratio M of each channel will be a constant value against each erroneous data. However, actually, signal noise can exist in each channel signal, and the ratio M can fluctuate in a certain range. Especially, when the signal level of the channel for data correction is low, the ratio M will fluctuate greatly because of the noise signal. When the signal ratio M of erroneous data approximately equals a set threshold value Vt, the condition M<Vt or M>Vt will appear alternately according to the fluctuation of the ratio M. Consequently, correction data calculated by Equation 12 and correction data calculated by Equation 15 will appear alternately on the screen corresponding to the erroneous data point. This image fluctuation on the screen will be a standing visualized noise. This problem can appear in the fifth embodiment. This seventh embodiment of the present invention provides the solution for reducing the influence on the screen when the signal ratio M fluctuates due to signal noise.

In this embodiment, the fluctuation of the correction data level will be reduced by generating correction data according to a differential value of a set threshold value and a signal ratio M instead of generating correction data by selecting one of two calculated correction data as shown before.

Figure 21:
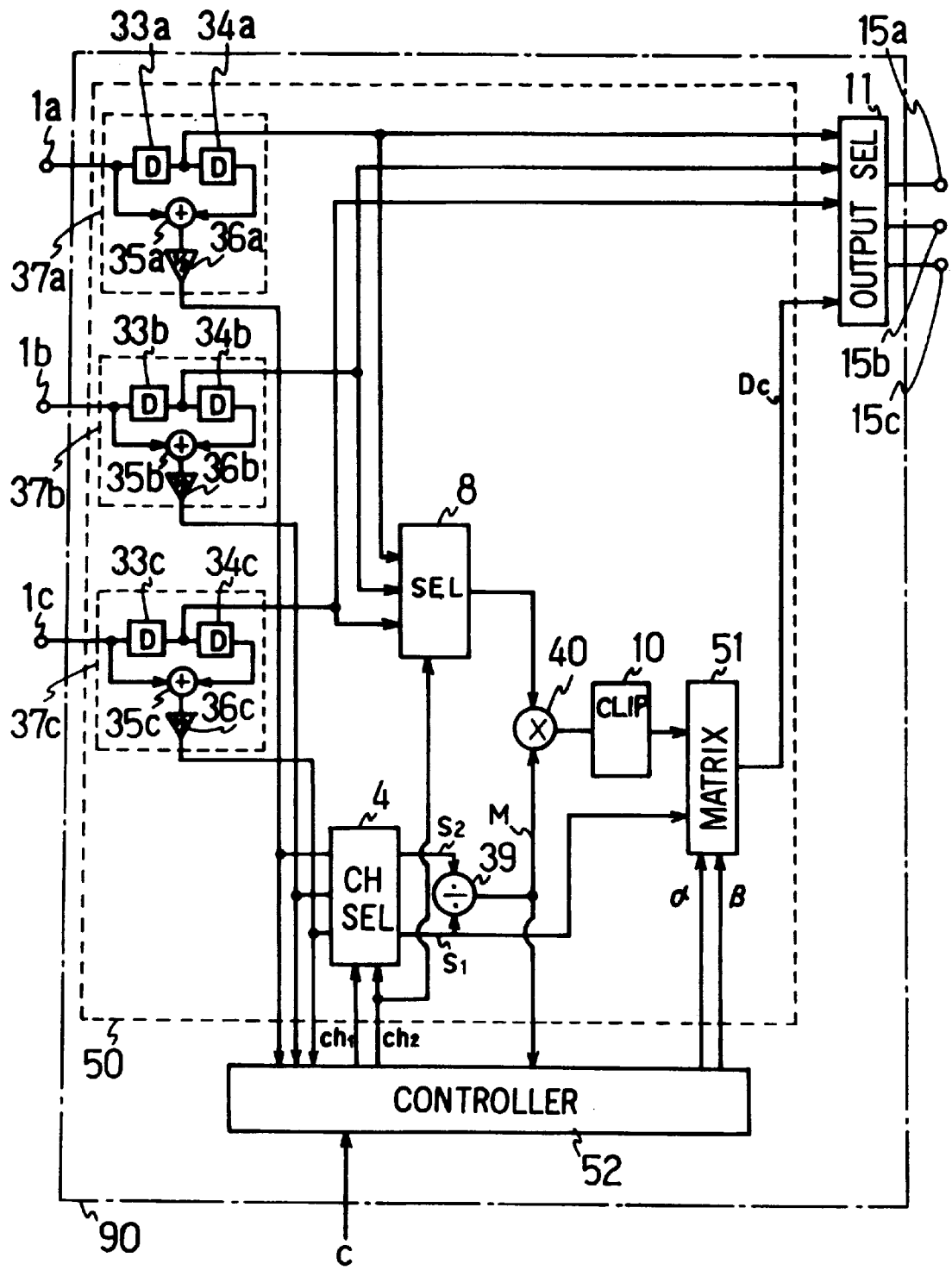
FIG. 21 is a circuit diagram showing a configuration of an error correction apparatus of a seventh embodiment of the present invention.
Figure 22:
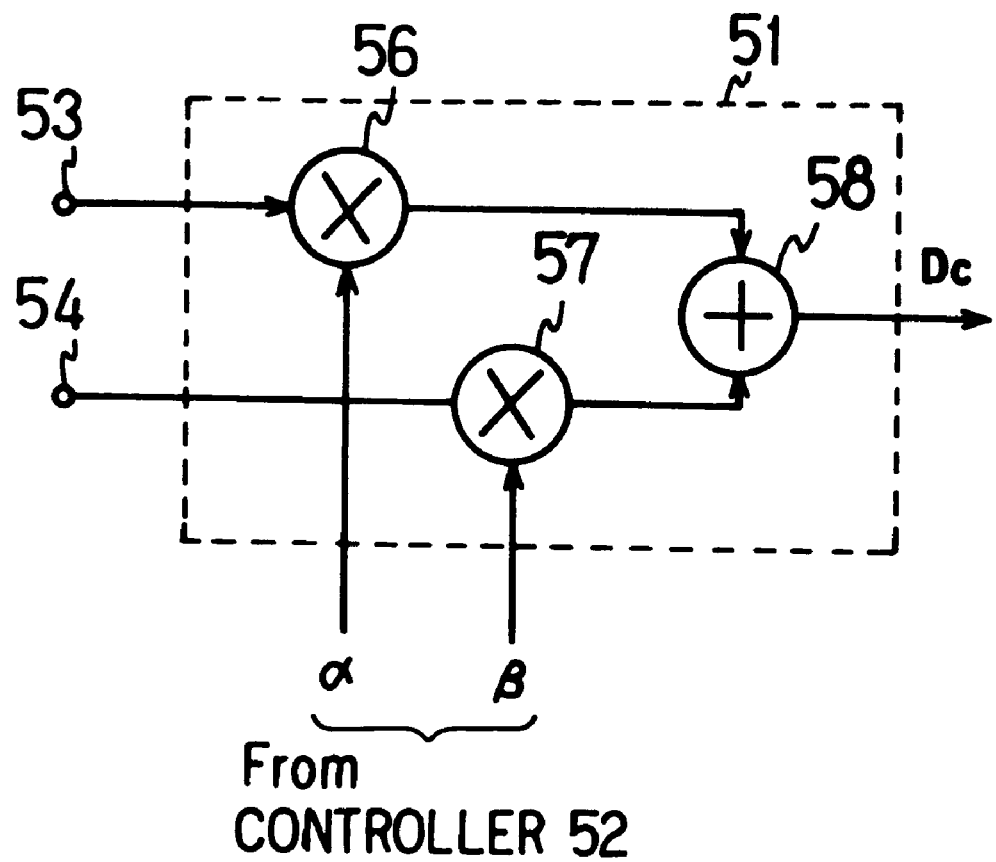
FIG. 22 is an enlarged detail of a circuit diagram of a matrix in the error correction apparatus shown in FIG. 21.

FIG. 21 is a circuit diagram showing a configuration of an error correction apparatus of a seventh embodiment of the present invention. In FIG. 21, an output selector 11 is the same as described before. A correction data circuit 50 is the same as a correction data circuit 38 described in FIG. 14 except for a clip circuit 10 being connected after a multiplier 40 and output signal from the clip circuit 10 and signal S1 being inputted to a matrix circuit 51. The configuration of the matrix circuit 51 is shown in FIG. 22. There are multipliers 56 and 57, and an output signal from the clip circuit 10 and signal S1 are inputted to the input nodes 53 and 54 thereof, along with multiplying inputted signals with coefficient α and β inputted from a controller 52 respectively. There is an adder 58, which outputs correction data Dc by adding outputs from the multiplier 56 and 57.

Figure 23:
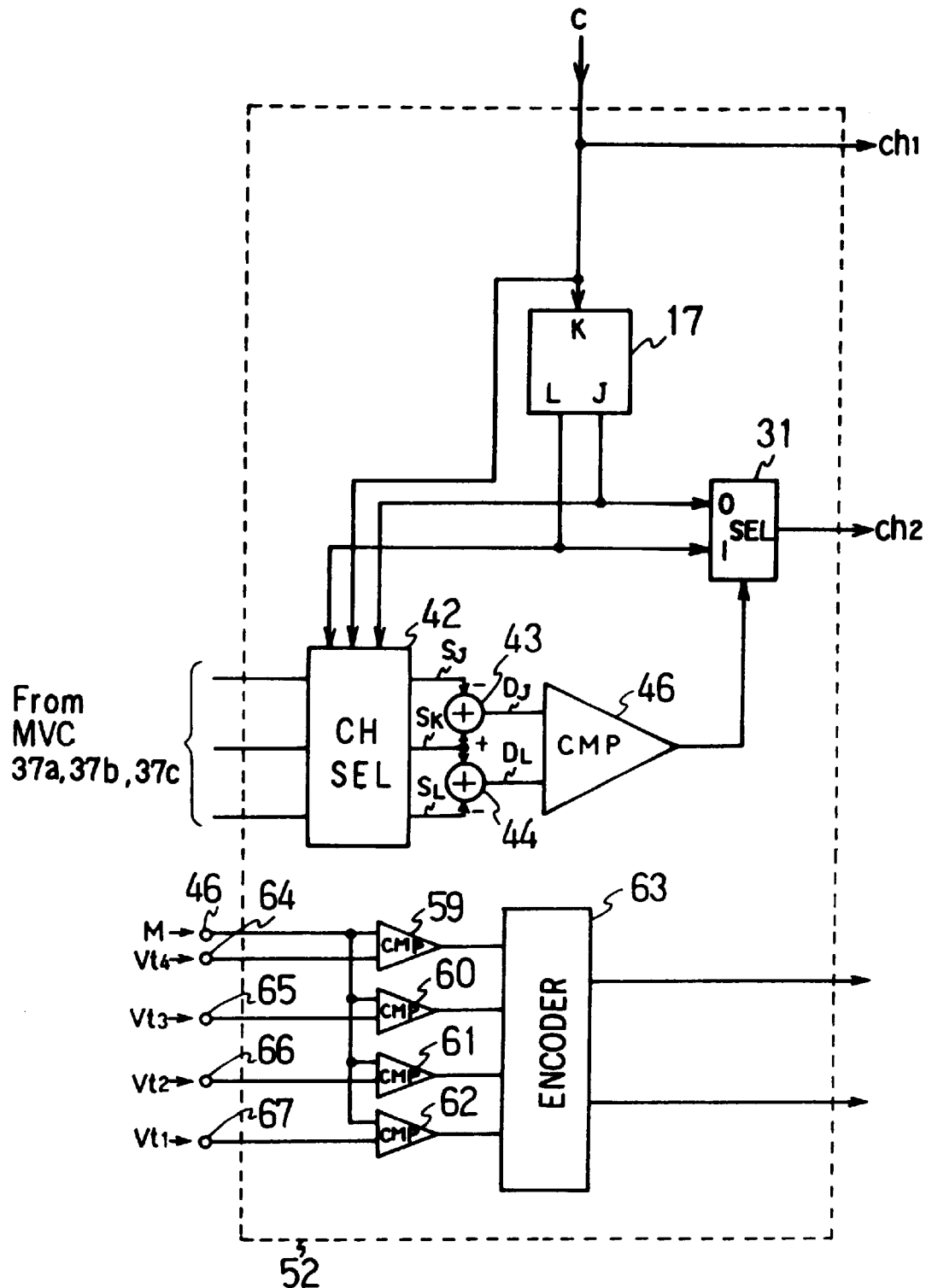
FIG. 23 is an enlarged detail of a circuit diagram of a controller in the error correction apparatus shown in FIG. 21.

The configuration of the controller 52 is shown in FIG. 23. It is the same as the controller 44 in FIG. 18 except for generating coefficient α and β instead of a control signal Cs. The configuration related to generating the coefficient α and β is described in the following description. There are comparators 59, 60, 61 and 62. A signal ratio M is inputted from an input node 46 commonly and each set threshold Vt4, Vt3, Vt2 and Vt1 is inputted to each input node 64, 65, 66 and 67 of each comparator respectively. Based on the outputs from the comparators, a coefficient encoder 63 generates coefficients α and β, which satisfy following condition shown as Equation 16.

$$\alpha + \beta = 1 \quad \text{Equation 16}$$

Figure 24:
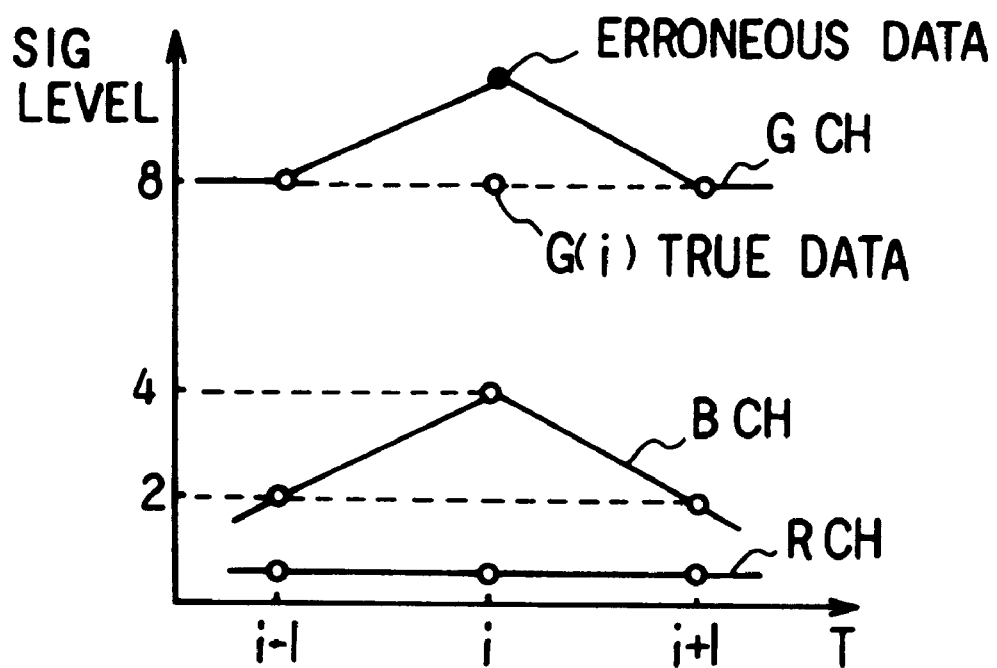
FIG. 24 is a conceptual graph showing input data of an error correction apparatus of a seventh embodiment of the present invention.

The operation of the above-mentioned error correction apparatus of the seventh embodiment is described with reference to FIG. 21 and FIG. 23 as below. In the following description, input signals are shown in FIG. 24 and signal G(i) is taken as erroneous data.

The operation at the time "i+1" is the same as that of the fifth embodiment, and a signal G'(i) calculated by Equation 12 is outputted from a clip circuit 10 and a signal calculated by Equation 15 is outputted from a channel selector 4. A matrix circuit 51 generates a correction data Gαβ(i) shown by the following Equation 17, and an output selector 11 replaces erroneous data G(i) with the calculated correction data Gαβ(i).

$$\begin{aligned} G\alpha\beta(i) &= \alpha * G'(i) + \beta * G''(i) \quad \text{Equation 17} \\ &= \alpha * B(i) * M + \beta * G_{AV} \\ &= \alpha * B(i) * \{G(i+1) + G(i-1)\} / \\ &\quad \{B(i+1) + B(i-1)\} + \\ &\quad \beta * \{G(i+1) + G(i-1)\}/2 \end{aligned}$$

Figure 25A:
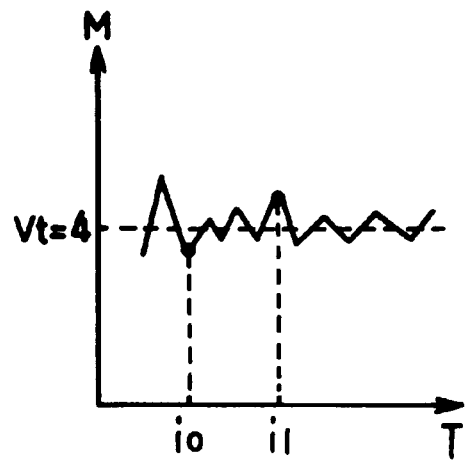
FIG. 25A is a graph showing the relation of signal ratio M and threshold of the error correction apparatus of the sixth embodiment of the present invention.

Next, the superiority of this seventh embodiment to the sixth embodiment when noise exists in the input signal will be described below with reference to FIG. 24 and FIG. 25. A signal ratio M, which is assumed to be 4 in FIG. 24, is supposed to fluctuate from 3.9 at the time "i0" to 4.2 at the one frame later period "i1" as shown in FIG. 25(a) under the influence of noise in an input signal. Here, the amount of the fluctuated level of corrected image on the screen in one frame period will be described. As for the sixth embodiment, a set threshold value Vt is taken as 4, a correction data value at the time of i0 will be 16 as calculated by Equation 10, and a correction data value at the time of i1 will be 8 as calculated by Equation 15. This means that there is an 8 level data value fluctuation in one frame period for an erroneous data G(i) on the screen image. As for the seventh embodiment, set threshold values Vt4, Vt3, Vt2 and Vt1 are assumed as shown in Table 3 and corresponding coefficient α and β are assumed as shown in Table 4.

TABLE 3

| | |
|---|---|
| Vt4 | 4.5 |
| Vt4 | 4.0 |
| Vt4 | 3.5 |
| Vt4 | 3.0 |

TABLE 4

| Input | Output | |
|---|---|---|
| M | α | β |
| Vt4 < M | 0 | 1 |
| Vt3 < M < Vt4 | ¼ | ¾ |
| Vt2 < M < Vt3 | ½ | ½ |
| Vt1 < M < Vt2 | ¾ | ¼ |
| < M < Vt1 | 1 | 0 |

Figure 25B:
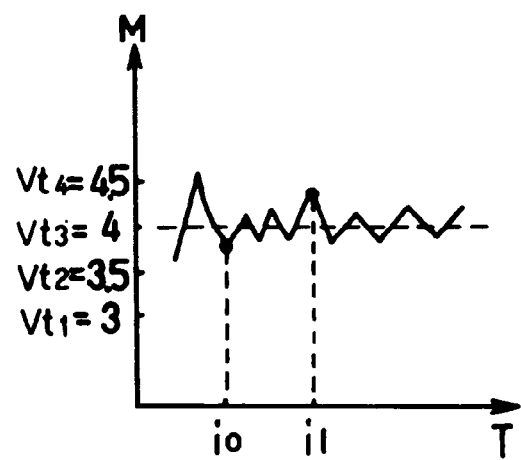
FIG. 25B is a graph showing the relation of signal ratio M and threshold of the error correction apparatus of the seventh embodiment of the present invention.

In this case, the relationship between the signal ratio M and each set threshold at the time of i0 and i1 are as shown in FIG. 25(b), and each correction data at the time i0 and i1 are 12 and 10 as calculated by Equation 17. This means that the fluctuation of output signal level is 2. Therefore, the fluctuation is smaller than that of the sixth embodiment, and the influence due to noise is small. When the amount of signal level fluctuation is more, the correction data with less amount of signal level fluctuation compared with a sixth embodiment will be generated because it is calculated based on coefficient α and β according to the amount of the signal level fluctuation.

In this embodiment, when the value of signal ratio M is smaller than Vt1 (M<Vt1), α equals 1 (α=1) and β equals 0 (β=0). Therefore, correction data will be generated by Equation 12. When value of signal ratio M is larger than Vt4, α equals 0 (α=0) and β equals 1 (β=1). Therefore, a correction data will be generated by Equation 15. As shown above, this seventh embodiment will follow the same operation as that of the sixth embodiment when the value of signal ratio M is not in the range from Vt1 to Vt4, and it will generate correction data according to the value of signal ratio M when the value of signal ratio M is in the range from Vt1 to Vt4. Therefore, data correction that is stable and not much affected by noise can be provided.

Eighth Embodiment

Generally speaking in digital signal processing, the data bit length after digital processing is made to be larger than those of the input signal in order to avoid rounding error. An error correction apparatus of the present invention outputs a correct signal as it is and an erroneous signal is replaced with correction data. Normally, the amount of erroneous data is much smaller than that of correct data. Therefore, S/N ratio of the output image after data correction will not much decrease when the effective bit length of correction data is smaller than that of the input signal. In addition, the rounding error which comes from effective bit length decrease (quantizing error) is much smaller than the correcting error (differential value of correction data and true data) in the correction data. Therefore, the quality of the displayed image is not much affected visually. For these reasons, this eighth embodiment achieves a small scaled error correction apparatus with small scaled correction data circuit by reducing the effective bit length of output correction data than that of input data.

Figure 26:
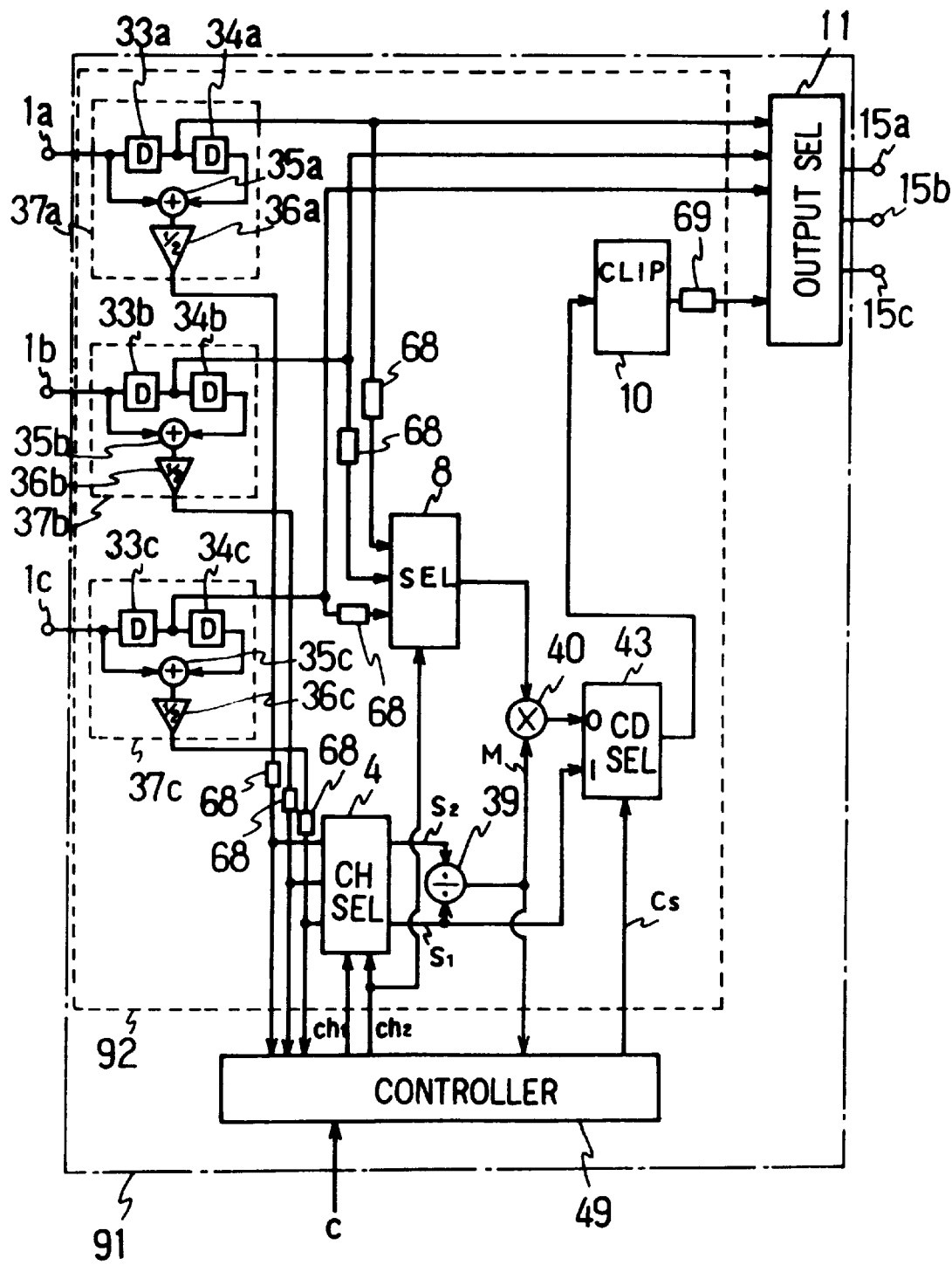
FIG. 26 is a circuit diagram showing a configuration of an error correction apparatus of an eighth embodiment of the present invention.

FIG. 26 is a circuit diagram showing a configuration of an error correction apparatus of an eighth embodiment of the present invention. In FIG. 26, the same number is used for the same elements shown in FIG. 19. The configuration of this eighth embodiment is the same as the sixth embodiment except for bit length reducing circuits 68 which reduces N bit from an input data, and a bit length adding circuit 69, which adds N bit to an input data. The bit length reducing circuit 68 reduces the required bit length from an input data by connecting only input signal lines which correspond to the required upper bit to the output node, and the bit length adding circuit 69 adds required bit length to an input data by connecting an additional required number of signal lines whose signal level is zero to the output node. The operation of the other parts is the same as the sixth embodiment. When the bit length of an input signal is 10 in the sixth embodiment, the required bit length of an input signal for each part is as below. Channel selector 4 is 11 bit length, selector 8 is 10 bit length, division circuit 39 is 11 times 11 bit length, multiplier 40 is 10 times 22 bit length, correction data selector 43 is 32 bit length and clip circuit 10 is 32 bit length On the other hand, as for this eighth embodiment, when reducing and adding bit length N is 2, (N=2), the required bit length of an input signal for each part is as below. Channel selector 4 is 9 bit length, selector 8 is 8 bit length, division circuit 39 is 9 times 9 bit length, multiplier 40 is 8 times 18 bit length, correction data selector 43 is 26 bit length and clip circuit 10 is 26 bit length Therefore, the circuit scale can be much reduced in this eighth embodiment. The number of N will be decided by considering S/N ratio and data length of input signals.

Figure 27:
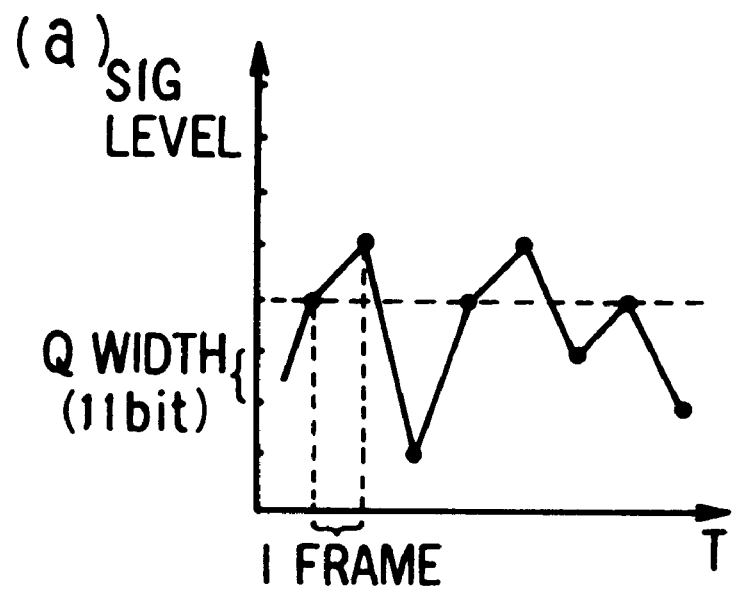
FIG. 27(a) is a graph showing the fluctuation of input signals of a bit length reducing circuit of an eighth embodiment of the present invention.
FIG. 27(b) is a graph showing the fluctuation of output signals of a bit length reducing circuit of an eighth embodiment of the present invention.
Figure 27:
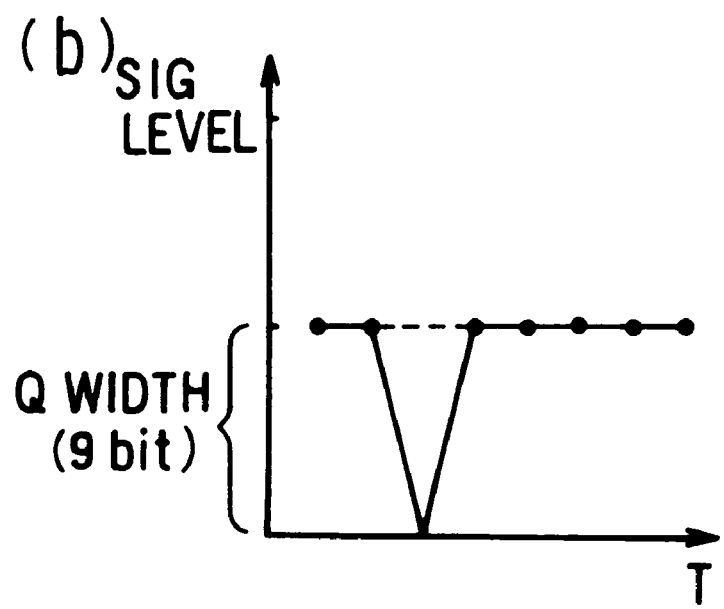

In addition, bit length reducing circuits 68 also work for reducing signal noise fluctuation. Therefore, noise-oriented signal level fluctuation in the correction data can be reduced. This effect is described in detail with reference to FIG. 27 below. FIG. 27(a) is a graph showing noise-oriented signal level fluctuation of input signals V of a bit length reducing circuit 68. As shown in FIG. 27(a), normally, noise-oriented signal level fluctuation is larger than the quantization width. On the other hand, as shown in FIG. 27(b), the quantization width becomes large. Therefore, noise-oriented signal level fluctuation can be rounded more in quantization, and the signal level fluctuation will be smaller than that of FIG. 27(a). Therefore, correction data fluctuation in the displayed image on screen will be reduced in visually due to fluctuation of the signal ratio M being reduced. In conclusion, the fluctuation of correction data on displayed screen almost can be reduced completely by reducing data bit length in order to make the quantization width large enough against noise-oriented signal level fluctuation.

In the above description for this eighth embodiment, the apparatus is based on that of the sixth embodiment. However, this embodiment of the present invention can be applied to other embodiments shown before and after.

Ninth Embodiment

Figure 28:
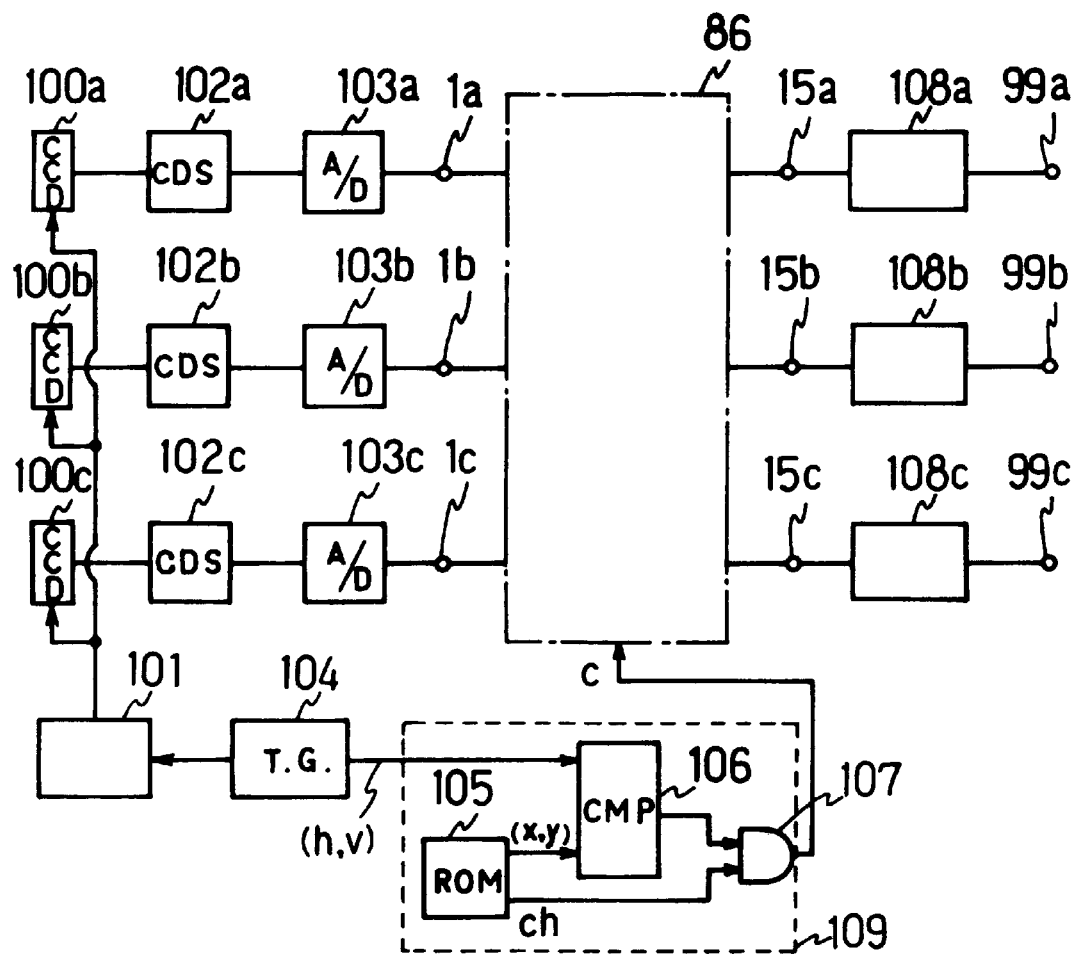
FIG. 28 is a circuit diagram showing a configuration of an error correction apparatus of a ninth embodiment of the present invention.
Figure 29:
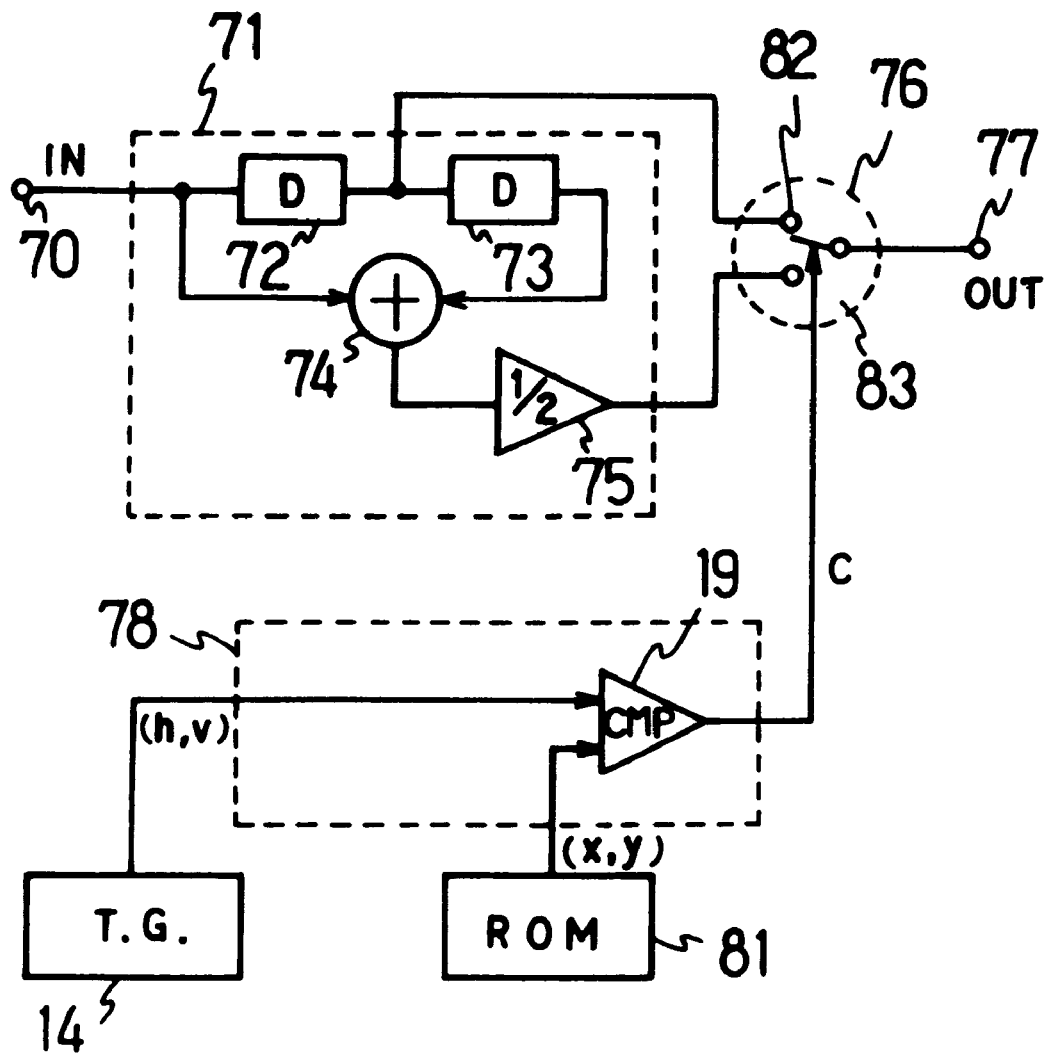
FIG. 29 is a circuit diagram showing a configuration of a conventional error correction apparatus.
Figure 30A:
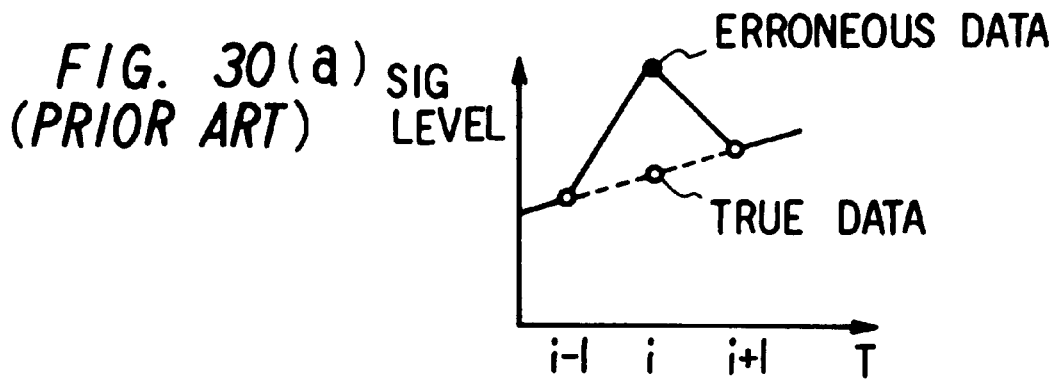
FIG. 30(a) is a graph showing input signals in case of low frequency of a conventional error correction apparatus.
Figure 30B:
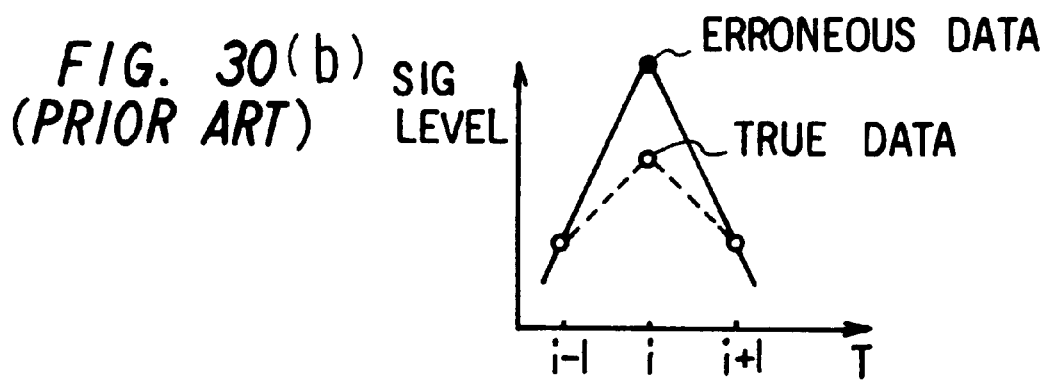
FIG. 30(b) is a graph showing input signals in case of high frequency of a conventional error correction apparatus.

FIG. 28 is a circuit diagram showing a configuration of an error correction apparatus of a ninth embodiment of the present invention. It is applies an error correction apparatus of the second embodiment to a video camera. The operation of this error correction apparatus of a ninth embodiment is described with reference to FIG. 28 as below. There are solid state image capturing devices 100a, 100b and 100c for capturing the R, G and B primary color data of subjects. Preferably, they include CCD (Charge Coupled Device). There are a drive circuit 101 for controlling the CCDs, and CDS (Corelated Double Sampling) 102a, 102b and 102c corresponding to R, G and B channels respectively for removing reset noise in output signals of the CCDs. There are A/D (Analog-to-digital) convertor 103a, 103b and 103c for converting the noise removed output signal of each R, G and B channel of CCDs pixel by pixel to a digital signal. The converted digital signal corresponding to each R, G and B channel is inputted via input node 1a, 1b and 1c to an error correction apparatus 86 described in the second embodiment. This error correction apparatus 86 generates correction data by the process described in the second embodiment and the correction data are outputted from 15a, 15b and 15c and inputted to process circuits 108a, 108b and 108c respectively. In this process, circuits 108a, 108b and 108c required data processing for picture image, such as clamp correction, gamma-correction and gain adjustment, and these processed signals are outputted via output nodes 99a, 99b and 99c. Furthermore, there is a T.G.(timing generator) 104 for generating pulses required for CCD driving and data processing. The quantized digital data are inputted from 1a, 1b and 1c to the T.G. 104 respectively, and T.G. 104 outputs abscissa and ordinate data (h, v) of each inputted quantized digital data as address data by synchronizing with the pulses to an error detection circuit 109. The error detection circuit 109 consists of a comparator 106, ROM (Read Only Memory) 105 and a 2 bit AND gate 107, and generates the channel signal C. In ROM 105, information about all defective CCD pixels is recorded in advance, which is sets of data described (X, Y, ch) where X is abscissa X, Y is ordinate Y and ch is an ID code for identifying the defective CCD pixel. This ROM 105 keeps on outputting an defective pixel address data (X, Y, ch) during processing of the corresponding erroneous data correction, and prepares and outputs the next defective pixel address data after finishing the present erroneous data correction processing. ROM 105 repeats this processing in order. As for ID code ch, it consists of 2 bits for identifying three channels R, G and B. As for X and Y, for example for HDTV (High Definition Television), which has 1920 effective pixels in the horizontal direction and 518 effective pixels in the vertical direction, X has 11 bits and Y has 10 bits. The corresponding of ID code and R, G and B channel is the same as shown by Table 1 in the first embodiment. The comparator 106 compares the inputted address data from T.G. and the inputted defective pixel address data from ROM 105, and outputs high level signal only when both data match (h=X, v=Y).

The operation of the above-mentioned error correction apparatus of the ninth embodiment is described below. The CCD 100a, 100b and 100c output data of R, G and B channels to the CDS 102a, 102b and 102c respectively for noise removing processing. After noise removing, each data is quantized and digitized by A/D convertor. The digitized data R(i), G(i) and B(i) at the time of "i" are assumed to be as shown by FIG. 4 and G(i) is taken to be erroneous data. The operation of the error detection circuit 109 is described as below. At the time of "i", address data (hi, vi) is inputted from the T.G. 104 to the comparator 106 with sychronizing to R(i), G(i) and B(i). At same time, address data (xi, yi) of the default pixel G(i) and ID code ch (ch=10) which specifies G channel are inputted from ROM 105 to the comparator 106 and the AND gate 107. Consequently, both data (hi, vi) and (xi, yi) match each other, and comparator 106 outputs a high level signal. Therefore, the AND gate 107 outputs the G channel code as the channel signal C.

In the error correction apparatus 86, the processing as described in the second embodiment is carried out and the erroneous data G(i) are corrected. The error correction apparatus 86 outputs correction data R(i), G'(i) and B(i) via output nodes 15a, 15b and 15c, and these correction data are outputted from output node 99a, 99b and 99c through process circuit 108a, 108b and 108c as video camera output data.

As shown above, all erroneous data from CCD are corrected and replaced with the correction data. Therefore, CCD which has been wasted conventionally because of containing many defective pixels can be used as a solid state image capturing device for a video camera.

A video camera of this ninth embodiment of the present invention can be applied to the third, fourth, sixth, seventh and eighth embodiments by replacing an error correction apparatus 86 with an error correction apparatus 87, 88, 89, 90, 91 respectively. The operation and effect of those video cameras are the same as described in the corresponding embodiment and the ninth embodiment.

From the foregoing detailed description of the present invention, it has been shown how the objects of the invention have been obtained in a preferred manner. However, modifications and equivalents of the disclosed concepts, such as those which would readily occur to one skilled in the art, are intended to be included within the scope of the claims.

What is claimed is:

1. An error correction apparatus for correcting erroneous data, comprising:

a plurality of picture data inputs;

a selector for selecting a first picture data and a second picture data from inputted picture data;

a correction data circuit for generating a correction data calculated by following formula $$y(i)+\{x(i-t)-y(i-t)\}$$

wherein i represents an arbitrary time, x(i) represents a first picture data at the time of i, y(i) represents a second picture data at the time of i, t represents an arbitrary period of time and x(i) is assumed to be an erroneous data;

an output selector for selecting the correction data and replacing the erroneous data with the correction data; and a plurality of picture data outputs for outputting the inputted picture data with the correction data.

2. The error correction apparatus according to claim 1, further comprising analog-digital converter for converting the inputted picture data inputs to digital data, and wherein arbitrary time i is equal to a sampling time period for digitizing.

3. The error correction apparatus according to claim 2, further comprising a means for reducing the data length of the digital converted data by more than one bit.

4. The error correction apparatus according to claim 1, wherein the selector selects a second picture data y(i) on the basis of following condition when the absolute value of $\{x(i-t)-z(i-t)\}$ is a minimum value, z(i) is selected as a second picture data y(i)

where z(i) is an arbitrary picture data from the picture data inputs other than first picture data x(i).

5. The error correction apparatus according to claim 1, wherein the selector selects a second picture data y(i) on the basis of following condition when the absolute value of $\{x(i+t)-z(i+t)\}$ is a minimum value, z(i) is selected as a second picture data y(i)

where z(i) is an arbitrary picture data from the picture data inputs other than first picture data x(i).

6. The error correction apparatus according to claim 1, wherein the selector selects a second picture data y(i) on the basis of following condition when the absolute value of $\{x(i-t)+x(i+t)-z(i-t)-z(i+t)\}$ is a minimum value, z(i) is selected as a second picture data y(i)

where z(i) is an arbitrary picture data from the picture data inputs other than first picture data x(i).

7. An error correction apparatus for correcting erroneous data, comprising:

a plurality of picture data inputs;

a selector for selecting a first picture data and a second picture data from inputted picture data;

a correction data circuit for generating a correction data calculated by the following formula $$y(i)+\{x(i+t)-y(i+t)\}$$

wherein i represents an arbitrary time, x(i) represents a first picture data at the time of i, y(i) represents a second picture data at the time of i, t represents an arbitrary period of time and x(i) is assumed to be an erroneous data;

an output selector for selecting the correction data and replacing the erroneous data with the correction data; and a plurality of picture data outputs for outputting the inputted picture data with the correction data.

8. The error correction apparatus according to claim 7, further comprising analog-digital converter for converting the inputted picture data inputs to digital data, and wherein arbitrary time i is equal to a sampling time period for digitizing.

9. The error correction apparatus according to claim 8, further comprising a means for reducing the data length of the digital converted data by more than one bit.

10. The error correction apparatus according to claim 7, wherein the selector selects a second picture data y(i) on the basis of following condition when the absolute value of $\{x(i-t)-z(i-t)\}$ is a minimum value, z(i) is selected as a second picture data y(i)

where z(i) is an arbitrary picture data from the picture data inputs other than a first picture data x(i).

11. The error correction apparatus according to claim 7, wherein the selector selects a second picture data y(i) on the basis of following condition when the absolute value of $\{x(i+t)-z(i+t)\}$ is a minimum value, z(i) is selected as a second picture data y(i)

where z(i) is an arbitrary picture data from the picture data inputs other than first picture data x(i).

12. The error correction apparatus according to claim 7, wherein the selector selects a second picture data y(i) on the basis of following condition when the absolute value of $\{x(i-t)+x(i+t)-z(i-t)-z(i+t)\}$ is a minimum value, z(i) is selected as a second picture data y(i)

where z(i) is an arbitrary picture data from the picture data inputs other than first picture data x(i).

13. An error correction apparatus for correcting erroneous data, comprising:

a plurality of picture data inputs;

a selector for selecting a first picture data and a second picture data from inputted picture data;

a correction data circuit for generating a correction data calculated by the following formula $$y(i)+\{x(i-t)+x(i+t)-y(i-t)-y(i+t)\}/2$$

wherein i represents an arbitrary time, x(i) represents a first picture data at the time of i, y(i) represents a second picture data at the time of i, t represents an arbitrary period of time and x(i) is assumed to be an erroneous data;

an output selector for selecting the correction data and replacing the erroneous data with the correction data; and a plurality of picture data outputs for outputting the inputted picture data with the correction data.

14. The error correction apparatus according to claim 13, further comprising analog-digital converter for converting the inputted picture data inputs to digital data, and wherein arbitrary time i is equal to a sampling time period for digitizing.

15. The error correction apparatus according to claim 14, further comprising a means for reducing the data length of the digital converted data by more than one bit.

16. The error correction apparatus according to claim 13, wherein the selector selects a second picture data y(i) on the basis of following condition when the absolute value of $\{x(i-t)-z(i-t)\}$ is a minimum value, z(i) is selected as a second picture data y(i)

where z(i) is an arbitrary picture data from the picture data inputs other than first picture data x(i).

17. The error correction apparatus according to claim 13, wherein the selector selects a second picture data y(i) on the basis of following condition when the absolute value of $\{x(i+t)-z(i+t)\}$ is a minimum value, z(i) is selected as a second picture data y(i)

where z(i) is an arbitrary picture data from the picture data inputs other than first picture data x(i).

18. The error correction apparatus according to claim 13, wherein the selector selects a second picture data y(i) on the basis of following condition when the absolute value of $\{x(i-t)+x(i+t)-z(i-t)-z(i+t)\}$ is a minimum value, z(i) is selected as a second picture data y(i)

where z(i) is an arbitrary picture data from the picture data inputs other than first picture data x(i).

19. An error correction apparatus for correcting erroneous data, comprising:

a plurality of picture data inputs;

a selector for selecting a first picture data and a second picture data from inputted picture data;

a correction data circuit for generating a correction data calculated by the following formula $$y(i)*\{x(i-t)+x(i+t)\}/\{y(i-t)+y(i+t)\}$$

wherein i represents an arbitrary time, x(i) represents a first picture data at the time of i, y(i) represents a second picture data at the time of i, t represents an arbitrary period of time and x(i) is assumed to be an erroneous data;

an output selector for selecting the correction data and replacing the erroneous data with the correction data; and a plurality of picture data outputs for outputting the inputted picture data with the correction data.

20. The error correction apparatus according to claim 19, further comprising analog-digital converter for converting the inputted picture data inputs to digital data, and wherein arbitrary time i is equal to a sampling time period for digitizing.

21. The error correction apparatus according to claim 20, further comprising a means for reducing the data length of the digital converted data by more than one bit.

22. The error correction apparatus according to claim 19, wherein the selector selects a second picture data y(i) on the basis of following condition when the absolute value of $\{x(i-t)-z(i-t)\}$ is a minimum value, z(i) is selected as a second picture data y(i)

where z(i) is an arbitrary picture data from the picture data inputs other than first picture data x(i).

23. The error correction apparatus according to claim 19, wherein the selector selects a second picture data y(i) on the basis of following condition when the absolute value of $\{x(i+t)-z(i+t)\}$ is a minimum value, z(i) is selected as a second picture data y(i)

where z(i) is an arbitrary picture data from the picture data inputs other than first picture data x(i).

24. The error correction apparatus according to claim 19, wherein the selector selects a second picture data y(i) on the basis of the following condition when the absolute value of $\{x(i-t)+x(i+t)-z(i-t)-z(i+t)\}$ is a minimum value, z(i) is selected as a second picture data y(i)

where z(i) is an arbitrary picture data from the picture data inputs other than first picture data x(i).

25. An error correction apparatus for correcting erroneous data, comprising a plurality of picture data inputs;

a selector for selecting a first picture data and a second picture data from inputted picture data;

a correction data circuit for generating a first correction data calculated by the following formula $$y(i)*\{x(i-t)+x(i+t)\}/\{y(i-t)+y(i+t)\}$$

and a second correction data calculated by the following formula $$\{x(i-t)+x(i+t)\}/2$$

wherein i represents an arbitrary time, x(i) represents a first picture data at the time of i, y(i) represents a second picture data at the time of i, t represents an arbitrary period of time and x(i) is assumed to be an erroneous data;

an output selector for selecting the first correction data or the second correction data, and replacing the erroneous data with the correction data selected; and a plurality of picture data outputs for outputting the inputted picture data with the correction data selected.

26. The error correction apparatus according to claim 25, further comprising analog-digital converter for converting the inputted picture data inputs to digital data, and wherein arbitrary time i is equal to a sampling time period for digitizing.

27. The error correction apparatus according to claim 26, further comprising a means for reducing the data length of the digital converted data by more than one bit.

28. The error correction apparatus according to claim 26, wherein the selector selects a second picture data y(i) on the basis of the following condition when the absolute value of $\{x(i-t)-z(i-t)\}$ is a minimum value, z(i) is selected as a second picture data y(i)

where z(i) is an arbitrary picture data from picture data inputs other than first picture data x(i).

29. The error correction apparatus according to claim 26, wherein the selector selects a second picture data y(i) on the basis of the following condition when the absolute value of $\{x(i+t)-z(i+t)\}$ is a minimum value, z(i) is selected as a second picture data y(i)

where z(i) is an arbitrary picture data from picture data inputs other than first picture data x(i).

30. The error correction apparatus according to claim 25, wherein the selector selects a second picture data y(i) on the basis of the following condition when the absolute value of $\{x(i-t)+x(i+t)-z(i-t)-z(i+t)\}$ is a minimum value, z(i) is selected as a second picture data y(i)

where z(i) is an arbitrary picture data from the picture data inputs other than first picture data x(i).

31. The error correction apparatus according to claim 25, wherein the output selector selects a first correction data or a second correction data on the basis of following condition when value $\{x(i-t)+x(i+t)\}/\{y(i-t)+y(i+t)\}$ is smaller than a set threshold value Vt, the output selector selects a first correction data, when value $\{x(i-t)+x(i+t)\}/\{y(i-t)+y(i+t)\}$ is larger than a set threshold value Vt, the output selector selects a second correction data, where Vt is larger than 1.

32. The error correction apparatus according to claim 25, wherein the output selector selects a first correction data or a second correction data on the basis of following condition when value $\{y(i-t)+y(i+t)\}/2$ is larger than a set threshold value Vm, the output selector selects a first correction data, when value $\{y(i-t)+y(i+t)\}/2$ is smaller than a set threshold value Vm, the output selector selects a second correction data.

33. An error correction apparatus for correcting erroneous data, comprising a plurality of picture data inputs;

a selector for selecting a first picture data and a second picture data from inputted picture data;

a correction data circuit for generating correction data calculated by the following formula $$\alpha*y(i)*\{x(i-t)+x(i+t)\}/\{y(i-t)+y(i+t)\}+\beta*\{x(i-t)+x(i+t)\}/2$$

wherein i represents an arbitrary time, x(i) represents a first picture data at the time of i, y(i) represents a second picture data at the time of i, α and β are real numbers satisfying α+β=1, t represents an arbitrary period of time and x(i) is assumed to be an erroneous data;

an output selector for selecting the correction data and replacing the erroneous data to the correction data; and more than one picture data output for outputting the inputted picture data with the correction data.

34. The error correction apparatus according to claim 33, further comprising analog-digital converter for converting the inputted picture data inputs to digital data, and wherein arbitrary time i is equal to a sampling time period for digitizing.

35. The error correction apparatus according to claim 34, further comprising a means for reducing the data length of the digital converted data by more than one bit.

36. The error correction apparatus according to claim 33, wherein the selector selects a second picture data y(i) on the basis of the following condition when the absolute value of $\{x(i-t)-z(i-t)\}$ is a minimum value, z(i) is selected as a second picture data y(i)

where z(i) is an arbitrary picture data from the picture data inputs other than first picture data x(i).

37. The error correction apparatus according to claim 33, wherein the selector selects a second picture data y(i) on the basis of the following condition when the absolute value of $\{x(i+t)-z(i+t)\}$ is a minimum value, z(i) is selected as a second picture data y(i)

where z(i) is an arbitrary picture data from the picture data inputs other than first picture data x(i).

38. The error correction apparatus according to claim 33, wherein the selector selects a second picture data y(i) on the basis of the following condition when the absolute value of $\{x(i-t)+x(i+t)-z(i-t)-z(i+t)\}$ is a minimum value, z(i) is selected as a second picture data y(i)

where z(i) is an arbitrary picture data from the picture data inputs other than first picture data x(i).

39. The error correction apparatus according to claim 33, further comprising a coefficient encoder for generating coefficients α as (VN−Vn)/(VN−V1) and β as (Vn−V1)/(VN−V1) on the condition that when Vn<M<Vn+1 where $M=\{x(i-t)+x(i+t)\}/\{y(i-t)+y(i+t)\}$, Vk is set threshold values (1<N; k=1, 2, . . . , N; V1<V2< . . . <VN).

40. The error correction apparatus according to claim 33, further comprising a coefficient encoder for generating coefficients α and β on the condition that when M<VL, α=1, and β=0 when VL<M<VH, α=(VH−M)/(VH−VL), and β=(M−VL)/(VH−VL)

when M>VH, α=0, and β=1 where $M=\{x(i-t)+x(i+t)\}/\{y(i-t)+y(i+t)\}$, VL and VH are set threshold values satisfying VL<VH.

41. The error correction apparatus according to claim 33, further comprising a coefficient encoder for generating coefficients α and β on the condition that when B<VL, α=0, and β=1 when VL<B<VH, α=(B−VL)/(VH−VL), and β=(VH−B)/(VH−VL)

when B>VH, α=1, and β=0 where $B=\{y(i-t)+y(i+t)\}/2$, VL and VH are set threshold values satisfying VL<VH.

42. A solid state image capturing apparatus for capturing picture data and correcting erroneous data, comprising a plurality of solid state image capturing devices; and an error correction apparatus for correcting erroneous data, comprising a plurality of picture data inputs from the solid state image capturing devices;

a selector for selecting a first picture data and a second picture data from inputted picture data;

a correction data circuit for generating correction data calculated by the following formula $$y(i)+\{x(i-t)-y(i-t)\}$$

wherein i represents an arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices and x(i) is assumed to be an erroneous data;

an output selector for selecting the correction data and replacing the erroneous data with the correction data; and a plurality of picture data outputs for outputting the inputted picture data with the correction data.

43. The solid state image capturing apparatus according to claim 42, further comprising analog-digital converter for converting the inputted captured image data from the solid state image capturing device to digital data pixel by pixel.

44. The solid state image capturing apparatus according to claim 43, further comprising a means for reducing the data length of the digital converted data by more than one bit and outputting to the error correction apparatus.

45. A solid state image capturing apparatus for capturing picture data and correcting erroneous data, comprising
   a plurality of solid state image capturing devices; and
   an error correction apparatus for correcting erroneous data, comprising
   a plurality of picture data inputs from the solid state image capturing devices;
   a selector for selecting a first picture data and a second picture data from inputted picture data;
   a correction data circuit for generating correction data calculated by the following formula $$y(i)+\{x(i+t)-y(i+t)\}$$

wherein i represents an arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices and x(i) is assumed to be an erroneous data;
   an output selector for selecting the correction data and replacing the erroneous data with the correction data; and
   a plurality of picture data outputs for outputting the inputted picture data with the correction data.

46. The solid state image capturing apparatus according to claim 45, further comprising analog-digital converter for converting the inputted captured image data from the solid state image capturing device to digital data pixel by pixel.

47. The solid state image capturing apparatus according to claim 46, further comprising a means for reducing the data length of the digital converted data by more than one bit and outputting to the error correction apparatus.

48. A solid state image capturing apparatus for capturing picture data and correcting erroneous data, comprising
   a plurality of solid state image capturing devices; and
   an error correction apparatus for correcting erroneous data, comprising
   a plurality of picture data inputs from the solid state image capturing devices;
   a selector for selecting a first picture data and a second picture data from inputted picture data;
   a correction data circuit for generating correction data calculated by the following formula $$y(i)+\{x(i-t)+x(i+t)-y(i-t)-y(i+t)\}/2$$

where i represents an arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices and x(i) is assumed to be an erroneous data;
   an output selector for selecting the correction data and replacing the erroneous data with the correction data; and
   a plurality of picture data outputs for outputting the inputted picture data with the correction data.

49. The solid state image capturing apparatus according to claim 48, further comprising analog-digital converter for converting the inputted captured image data from the solid state image capturing device to digital data pixel by pixel.

50. The solid state image capturing apparatus according to claim 49, further comprising a means for reducing the data length of the digital converted data by more than one bit and outputting to the error correction apparatus.

51. A solid state image capturing apparatus for capturing picture data and correcting erroneous data, comprising
   a plurality of solid state image capturing devices; and
   an error correction apparatus for correcting erroneous data, comprising
   a plurality of picture data inputs from the solid state image capturing devices;
   a selector for selecting a first picture data and a second picture data from inputted picture data;
   a correction data circuit for generating correction data calculated by the following formula $$y(i)*\{x(i-t)+x(i+t)\}/\{y(i-t)+y(i+t)\}$$

wherein i represents an arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices and x(i) is assumed to be an erroneous data;
   an output selector for selecting the correction data and replacing the erroneous data with the correction data; and
   a plurality of picture data outputs for outputting the inputted picture data with the correction data.

52. The solid state image capturing apparatus according to claim 51, further comprising analog-digital converter for converting the inputted captured image data from the solid state image capturing device to digital data pixel by pixel.

53. The solid state image capturing apparatus according to claim 52, further comprising a means for reducing the data length of the digital converted data by more than one bit and outputting to the error correction apparatus.

54. A solid state image capturing apparatus for capturing picture data and correcting erroneous data, comprising
   a plurality of solid state image capturing devices; and
   an error correction apparatus for correcting erroneous data, comprising
   a plurality of picture data inputs from the solid state image capturing devices;
   a selector for selecting a first picture data and a second picture data from inputted picture data;
   a correction data circuit for generating a first correction data calculated by the following formula $$y(i)*\{x(i-t)+x(i+t)/y\{(i-t)+y(i+t)\}$$

and a second correction data calculated by following equation $$\{x(i-t)+x(i+t)\}/2$$

wherein i represents an arbitrary time, x(i) represents a first picture data outputted from the first solid state image capturing device at the time of i, y(i) represents a second picture data outputted from the second solid state image capturing device at the time of i, t represents time which is equal to an output pixel period of the solid state image capturing devices and x(i) is assumed to be an erroneous data;

an output selector for selecting the correction data and replacing the erroneous data with the correction data; and a plurality of picture data outputs for outputting the inputted picture data with the correction data.

55. The solid state image capturing apparatus according to claim 54, further comprising analog-digital converter for converting the inputted captured image data from the solid state image capturing device to digital data pixel by pixel.

56. The solid state image capturing apparatus according to claim 55, further comprising a means for reducing the data length of the digital converted data by more than one bit and outputting to the error correction apparatus.

57. A solid state image capturing apparatus for capturing picture data and correcting erroneous data, comprising a plurality of solid state image capturing devices; and an error correction apparatus for correcting erroneous data, comprising a plurality of picture data inputs from the solid state image capturing devices;

a selector for selecting a first picture data and a second picture data from inputted picture data;

a correction data circuit for generating correction data calculated by the following formula $$\alpha^*y(i)^*\{x(i-t)+x(i+t)\}/\{y(i-t)+y(i+t)\}+\beta^*\{x(i-t)+x(i+t)\}/2$$

wherein i represents an arbitrary time, x(i) represents a first picture data outputted from the first solid state image capturing device at the time of i, y(i) represents a second picture data outputted from the second solid state image capturing device at the time of i, $\alpha$ and $\beta$ are real numbers satisfying $\alpha+\beta=1$, t represents time which is equal to an output pixel period of the solid state image capturing devices and x(i) is assumed to be an erroneous data;

an output selector for selecting the correction data and replacing the erroneous data with the correction data; and a plurality of picture data outputs for outputting the inputted picture data with the correction data.

58. The solid state image capturing apparatus according to claim 57, further comprising analog-digital converter for converting the inputted captured image data from the solid state image capturing device to digital data pixel by pixel.

59. The solid state image capturing apparatus according to claim 58, further comprising a means for reducing the data length of the digital converted data by more than one bit and outputting to the error correction apparatus.

* * * * *